United States Patent

Nishiumi et al.

[11] Patent Number: 5,963,196
[45] Date of Patent: Oct. 5, 1999

[54] IMAGE PROCESSING SYSTEM UTILIZING ANALOG JOYSTICK

[75] Inventors: Satoshi Nishiumi; Kazuo Koshima; Yasunari Nishida, all of Kyoto, Japan

[73] Assignee: Nintendo Co., Ltd., Kyoto, Japan

[21] Appl. No.: 08/765,474

[22] PCT Filed: May 10, 1996

[86] PCT No.: PCT/JP96/01237

§ 371 Date: Apr. 29, 1997

§ 102(e) Date: Apr. 29, 1997

[87] PCT Pub. No.: WO96/35985

PCT Pub. Date: Nov. 14, 1996

[30] Foreign Application Priority Data

May 10, 1995 [JP] Japan .................................... 7-137298
Oct. 9, 1995 [JP] Japan .................................... 7-288006

[51] Int. Cl.⁶ ........................................................ G09G 5/08
[52] U.S. Cl. ............................................................ 345/161
[58] Field of Search .................................. 345/160, 161, 345/162

[56] References Cited

U.S. PATENT DOCUMENTS

| | | |
|---|---|---|
| 3,729,129 | 4/1973 | Fletcher et al. . |
| 4,161,726 | 7/1979 | Burson et al. . |
| 4,359,222 | 11/1982 | Smith, III et al. . |
| 4,469,330 | 9/1984 | Asher . |
| 4,552,360 | 11/1985 | Bromley et al. . |
| 4,587,510 | 5/1986 | Kim . |
| 4,659,313 | 4/1987 | Kuster et al. . |
| 4,685,678 | 8/1987 | Frederiksen . |
| 4,748,441 | 5/1988 | Brzezinski . |
| 4,887,966 | 12/1989 | Gellerman . |
| 4,924,216 | 5/1990 | Leung . |
| 4,933,670 | 6/1990 | Wislocki . |
| 4,974,192 | 11/1990 | Face et al. . |
| 4,976,429 | 12/1990 | Nagel . |
| 5,012,230 | 4/1991 | Yasuda . |
| 5,046,739 | 9/1991 | Reichow . |

(List continued on next page.)

FOREIGN PATENT DOCUMENTS

| | | |
|---|---|---|
| 61-16641 | 1/1986 | Japan . |
| 61-185138 | 11/1986 | Japan . |
| 6-54962 | 3/1994 | Japan . |
| 6-190145 | 7/1994 | Japan . |
| 2234575 | 2/1991 | United Kingdom . |
| 2 244 546 | 12/1991 | United Kingdom . |
| 2 263 802 | 8/1993 | United Kingdom . |
| WO97/17651 | 5/1997 | WIPO . |

OTHER PUBLICATIONS

6 Photographs of Sony PlayStation: 1) top case and compact disk; 2) hand controller; 3) internal circuit boards (top view); 4) internal circuit boards (top view); 5) compact disk reader (bottom view); and internal main circuit board (bottom view).

*Knuckles Chaotix Instruction Manual*, SEGA, Redwood City, California, #84503 (1995).

*Nintendo Power*, vol. 30, p. 22, PilotWings article.

(List continued on next page.)

Primary Examiner—Mark K. Zimmerman
Assistant Examiner—Ronald Laneau
Attorney, Agent, or Firm—Nixon & Vanderhye P.C.

[57] ABSTRACT

An image processing system includes an image processor (10) which generates image data of an image to be displayed on a monitor, and an analog joystick (45) which modifies the image data, the image processor generates the image data on the basis of joystick data from the analog joystick. An inclinable range of a lever (474) of the analog joystick is restricted by a guide ring (486), and an inclined amount of the lever is counted by counters (444X, 444Y). The joystick data is output by correcting counter data in a specific area (a central area and/or peripheral area) set at a portion of the inclinable range.

24 Claims, 33 Drawing Sheets

U.S. PATENT DOCUMENTS

| | | |
|---|---|---|
| 5,160,918 | 11/1992 | Saposnik et al. . |
| 5,203,563 | 4/1993 | Loper, III . |
| 5,207,426 | 5/1993 | Inoue et al. . |
| 5,213,327 | 5/1993 | Kitaue . |
| 5,237,311 | 8/1993 | Mailey et al. . |
| 5,245,320 | 9/1993 | Bouton . |
| 5,290,034 | 3/1994 | Hineman . |
| 5,329,276 | 7/1994 | Hirabayashi . |
| 5,390,937 | 2/1995 | Sakaguchi et al. . |
| 5,394,168 | 2/1995 | Smith, III et al. . |
| 5,421,590 | 6/1995 | Robbins . |
| 5,436,640 | 7/1995 | Reeves . |
| 5,515,044 | 5/1996 | Glatt . |
| 5,551,693 | 9/1996 | Goto et al. . |
| 5,551,701 | 9/1996 | Bouton et al. . |
| 5,558,329 | 9/1996 | Liu . |
| 5,563,629 | 10/1996 | Caprara . |
| 5,589,854 | 12/1996 | Tsai . |
| 5,615,083 | 3/1997 | Burnett ................................ 345/161 |
| 5,624,117 | 4/1997 | Ohkubo et al. . |
| 5,643,087 | 7/1997 | Marcus et al. . |
| 5,663,747 | 9/1997 | Shulman ................................ 345/161 |
| 5,684,512 | 11/1997 | Schoch et al. ....................... 345/161 |
| 5,704,837 | 1/1998 | Iwasaki et al. . |
| 5,714,981 | 2/1998 | Scott-Jackson et al. . |
| 5,734,373 | 3/1998 | Rosenberg et al. . |
| 5,786,807 | 5/1996 | Couch et al. ........................ 345/161 |
| 5,793,356 | 7/1995 | Svancarel et al. ................... 345/161 |

B1 4,870,389   6/1997   Ishiwata et al. .

OTHER PUBLICATIONS

*Nintendo Power,* vol. 31, p. 35, PilotWings article.
*Nintendo Power,* vol. 31, pp. 74–76, PilotWings article.
*Nintendo Power,* vol. 38, p. 25, PilotWings article.
*Nintendo Power,* vol. 46, PilotWings article.
*PilotWings Instruction Booklet,* Super Nintendo Entertainment System, SNS–PW–USA, copyright 1991.
*PilotWings, It's a Festival of Flight,* Top Secret Password Nintendo Player's Guide, pp. 82–83 and 160, copyright 1991.
*PilotWings, Soar with the Flight Club,* Super Nintendo Entertainment System Play's Guide, pp. 100–105, copyright 1991.
*SEGA Genesis 32X Instruction Manual,* SEGA, Redwood City California, #672–2116 (1994).
*SEGA Genesis Instruction Manual,* SEGA, Hayward, California,#3701–926–0–01 (1994).
*SONIC 2 The Hedgehog Instruction Manual,* SEGA, Hayward, California, #672–0944 3701–925–0–01 (1992).
Sony PlayStation Instruction Manual, and informational materials, Sony Computer Entertainment Inc. 1995.
"Hardware Reset With Microcode Warning Period", *IBM Technical Disclosure Bulletin,* vol. 33, No. 11, Apr. 1991, pp. 105–106.

FIG. 8

RAM 174

| 1CH COMMAND STORAGE PLACE 1741 |
| 1CH TRANSMISSION/RECEPTION DATA STORAGE PLACE 1742 |
| 2CH COMMAND STORAGE PLACE 1743 |
| 2CH TRANSMISSION/RECEPTION DATA STORAGE PLACE 1744 |
| 3CH COMMAND STORAGE PLACE 1745 |
| 3CH TRANSMISSION/RECEPTION DATA STORAGE PLACE 1746 |
| 4CH COMMAND STORAGE PLACE 1747 |
| 4CH TRANSMISSION/RECEPTION DATA STORAGE PLACE 1748 |

FIG. 17

| 1 BYTE | B | A | G | START | ↑ | ↓ | ← | → |
|---|---|---|---|---|---|---|---|---|
| 2 BYTE | JSRST | 0 | L | R | E | D | C | F |
| 3 BYTE | X ORDINATE ||||||||
| 4 BYTE | Y ORDINATE ||||||||

\* HIGH LEVEL WHEN L, R, AND START BUTTONS ARE SIMULTANEOUSLY

PHYSICAL COORDINATE OF JOYSTICK

DISPLAY SCREEN

PHYSICAL COORDINATE OF JOYSTICK

DISPLAY SCREEN

IMAGE PROCESSING SYSTEM UTILIZING ANALOG JOYSTICK

FIELD OF ARTS

The present invention relates to an image processing system utilizing analog joystick. More specifically, the present invention relates to an image processing system in which an analog joystick which outputs an operation signal according to an inclined direction and an inclined amount of a lever is connected to an image processor which generates on the basis of a program image data of an image displayed on a monitor such as a CRT and etc., and the image data, i.e. the image is modified in accordance with an operation of the lever by an operator.

PRIOR ARTS

A conventional game machine controller 1 shown in FIG. 1 includes a rectangular housing 1a, and a select switch 3 for selecting a game content, a start switch 2 for designating a start of the game, a cross direction switch 4 for designating a moving direction of a game character during the game, and two action switches 5a and 5b for selecting or designating an action of the character, all the switches being provided on an upper surface of the housing 1a.

In a game machine controller 1 shown in FIG. 2, in addition to the select switch 3, the start switch 2 and the cross direction switch 4, four action switches 5a, 5b, 5c and 5d are provided on the surface of the housing 1a', and two switches 6a and 6b are provided on a rear surface of the housing 1a' at positions that index fingers or middle fingers of both hands can reach while palms of the both hands are brought into contact with left and right side surfaces of the housing 1a'.

Furthermore, in a controller 1 shown in FIG. 3, a cross direction switch 4a and action switches 5a and 5b, and a cross direction switch 4b and action switches 5c and 5d are arranged on left and right housings 1a and 1b, respectively.

In the prior art controllers shown in FIG. 1 to FIG. 3, a direction signal for designating a direction that an image on the monitor is to be moved is outputted with utilizing the cross direction switch 4 or 4a (and 4b). However, in the conventional cross direction switch, switch contacts are provided at four directions of upper (North), lower (South), left (West) and right (East) on the monitor screen, that is, at four directions of front, rear, left and right in a case where the controller is viewed in plain, and according to a switch contact being turned-on, the direction signal which designates one of the four directions can be outputted. That is, the cross switches provided in the conventional controllers is a kind of digital joysticks. Therefore, there is an advantage that an upper direction signal and a right direction signal can be simultaneously obtained if the operator simultaneously depresses an upper direction designation button and a right direction designation button. However, there was a problem that the operator can not designate an arbitrary direction other than determined directions.

On the other hand, in Japanese Publication No. 5-19925 published on May 25, 1993, for example, an analog joystick which comprises a lever and outputs a direction signal determined by a direction that the lever is inclined has been proposed. The analog joystick utilizes rotatable variable resistors, and is capable of outputting a signal of the direction that the lever is inclined as well as a signal according to an inclined amount of the lever. However, in such a conventional analog joystick, in different from the digital joystick, it is impossible to simultaneously designate two directions, and therefore, there occurs an inconvenience according to the game content.

Specifically, it is considered that the analog joystick shown in the Japanese Patent Publication No. 5-19925 is applied to a racing game. At this time, it is assumed that if the lever is inclined toward upper (front), "stepping on an accelerator" is set, and if the lever is inclined toward lower (rear), "stepping on a brake" is set, and if the lever is inclined toward right, "wheel right" is set, and if the lever is inclined toward left "wheel left" is set. In such a case, if the conventional analog joystick is utilized, when the lever is inclined toward right or left at a time that the lever is inclined toward upper (front) at a maximum inclination amount, the lever is guided by an inner edge of a guide ring (an inner edge defining a circular hole 111 of a case 11 in the Japanese Patent Publication No. 5-19925), and therefore, the lever is naturally put-back to a right rear direction. Therefore, when the accelerator is fully stepped, if the wheel is turned right or left, a stepped amount of the accelerator is naturally decreased. That is, there is a problem that the wheel can not be turned right or left in a state where the accelerator is fully stepped.

This problem is due to a fact that a shape of the guide ring which guides the lever of the prior art analog joystick is fixed at a circular shape.

SUMMARY OF THE INVENTION

Therefore, a principal object of the present invention is to provide a novel image processing system capable of suitably changing an inclinable range of a lever of an analog joystick.

Another object of the present invention is to provide an image processing system in which a desired direction can be surely set with utilizing the analog joystick and the inclinable range of the lever of the analog joystick can be suitably changed.

An image processing system according to the present invention is an image processing system which comprises an image processor (10) which generates image data of an image to be displayed on a monitor and an analog joystick (45) which modifies the image data, comprising: a lever which is inclined within an inclinable range when the lever is operated by an operator and rests at a predetermined state if the lever is not operated by the operator; a joystick data outputting means (444X, 444Y, 442) which outputs joystick data indicative of an inclined position of the lever; and an image data outputting means (11, 16) which outputs image data on the basis of the joystick data, the joystick data outputting means including a first correction means (S2, S4, S5) which corrects the joystick data in a specific area set in a portion of the inclinable range.

If the inclinable rage of the lever of an octagonal shape, for example, is defined by a guide ring, for example, the specific area is set as an area of a difference between the octagonal shape and another shape such as a circular shape, rectangular shape and etc. In such the specific area, the joystick data outputting means does not output the joystick data primarily defined by the inclined position of the lever but outputs joystick data corrected by the first correction means. Therefore, in the specific area, the image data outputting means outputs the image data on the basis of corrected joystick data.

In accordance with the present invention, since the joystick data is corrected in the specific area within a physically inclinable range of the lever of the analog joystick, it is to possible to make a shape of a substantially inclinable range of the lever different from the shape of the physically inclinable range, and accordingly, it is possible to set a most suitable substantially inclinable range according to a use, e.g. a game content or the like.

Furthermore, in the present invention, by setting the specific area as a dead area, it is possible to prevent the image on the monitor from being undesirably changed by a vibration or an undesired motion of a hand of the operator.

Furthermore, if the dead area is set in association with a neutral position of the lever, a deviation of data at the neutral position of the lever can be solved. That is, it is possible to solve a problem that the data can not return to "0" at the neutral position of the lever due to a friction or the like. Namely, it is possible to set correct "0".

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 8 is an illustrative view showing a memory map of a RAM in FIG. 7;

FIG. 17 is an illustrative view showing data of the analog joystick and respective buttons of the controller;

FIG. 28 is a flowchart showing a reset operation of the X counter and the Y counter at a time that a power source is turned-on;

FIG. 33 is a flowchart showing the method;

BEST MODE FOR EMBODYING THE INVENTION

In the following, an embodiment in which an analog joystick is applied to a video game machine which displays a game character on a screen of a monitor in accordance with a game program stored in a memory device (semiconductor memory, CD-ROM and etc.) and controls the game character will be described. However, it is pointed-out in advance that the present invention can be applied to a generic image processing system including an image processor which generates image data of an image to be displayed on the monitor in accordance with a program, and the analog joystick.

Figure 4:
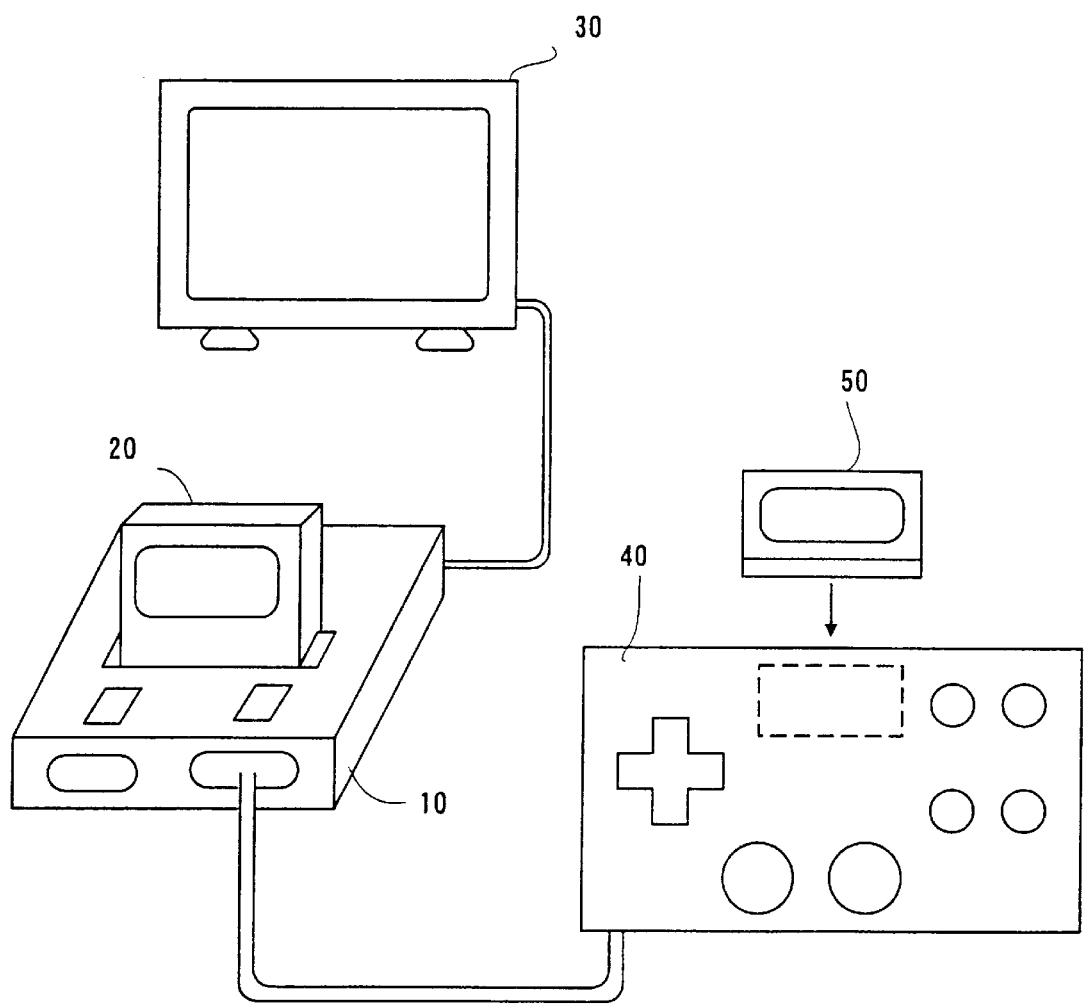
FIG. 4 is an illustrative view showing one embodiment according to the present invention.

FIG. 4 is an illustrative view showing an image processor 10 and a controller 40 according to one embodiment of the present invention. The image processor 10 is provided with a cartridge connection connector at an upper portion of the image processor 10, and a cartridge 20 is inserted into the connector. The cartridge 20 is provided with a printed-circuit board which is connected to a cartridge connector 13 so as to be electrically connected to the image processor 10, and then, data can be transmitted or received between the image processor 10 and the cartridge 20. An external ROM which stores data of a program and etc. and a readable/writable memory such as a RAM for storing data processed by the image processor 10 as necessary are mounted on the printed-circuit board. A memory map of the external memory includes, as shown by an external memory area of FIG. 6, an image data area 201 in which image data necessary for the image processor 10 to generate an image signal is stored, and a program data area 202 in which program data necessary for a CPU 11 to perform predetermined operations is stored.

Controller connectors 181–184 for connecting controllers 40 are provided on a front surface of the image processor 10. By connecting the controllers 40 to the controller connectors 181"184, the image processor 10 is electrically connected to the controllers 40, and then, data can be transmitted or received between the image processor 10 and the controllers 40.

The controllers 40 are connected to the controller connectors 181–184 of the image processor 10 by connection jacks 41 which are provided on the image processor 10 and cables 42. Each of the controllers 40 is formed in a shape that can be grasped by both hands or a hand, and at an outside of a housing of the controller 40, a plurality of buttons which generate electrical signals upon the depression and an operating portion (a lever of the analog joystick) which stands upright are projected.

Although electrical circuits and mechanical portions are accommodated in the image processor 10 and a housing of the controller 40, these will be described in detail later.

Figure 5:
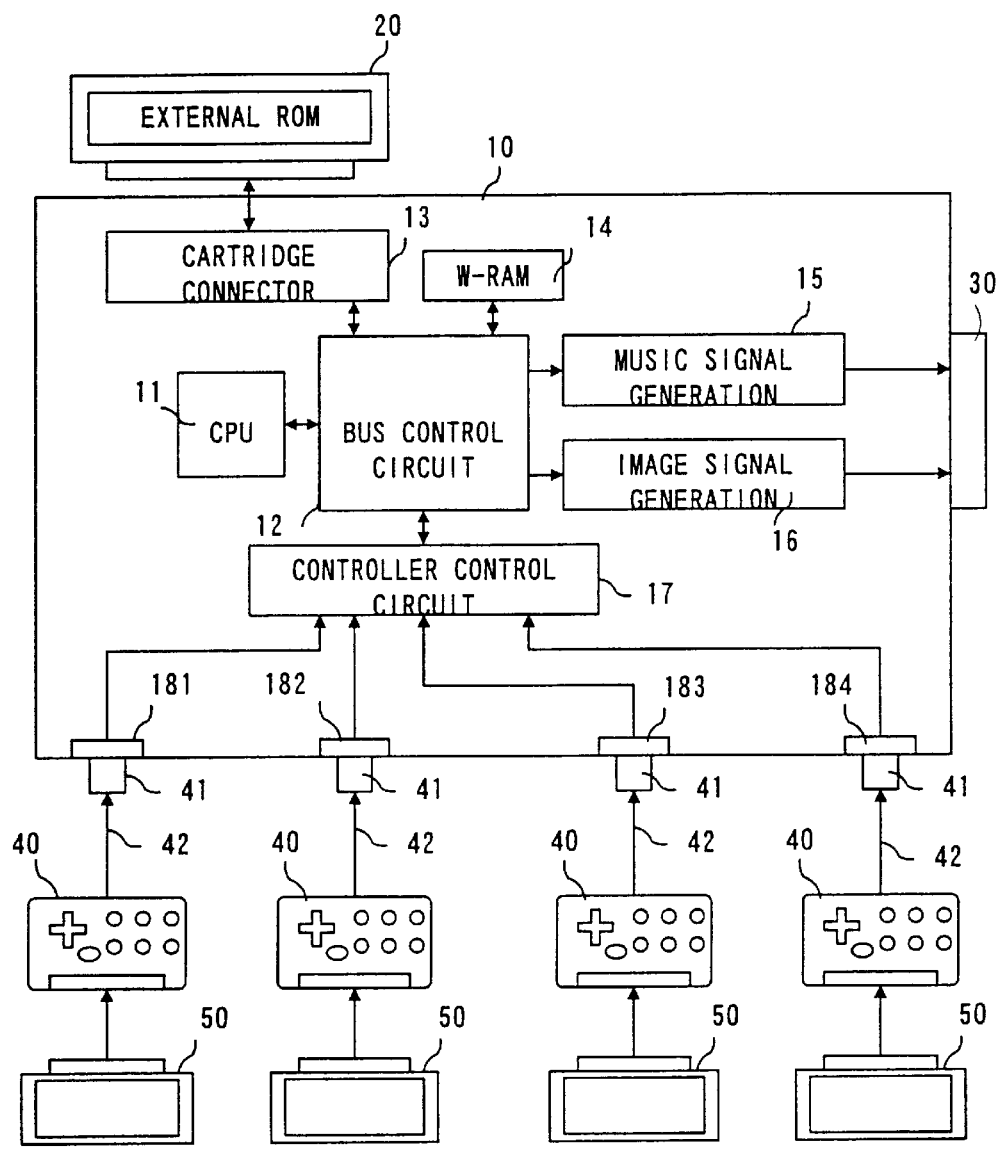
FIG. 5 is a block diagram showing an image processor of FIG. 4 embodiment in detail.
Figure 6:
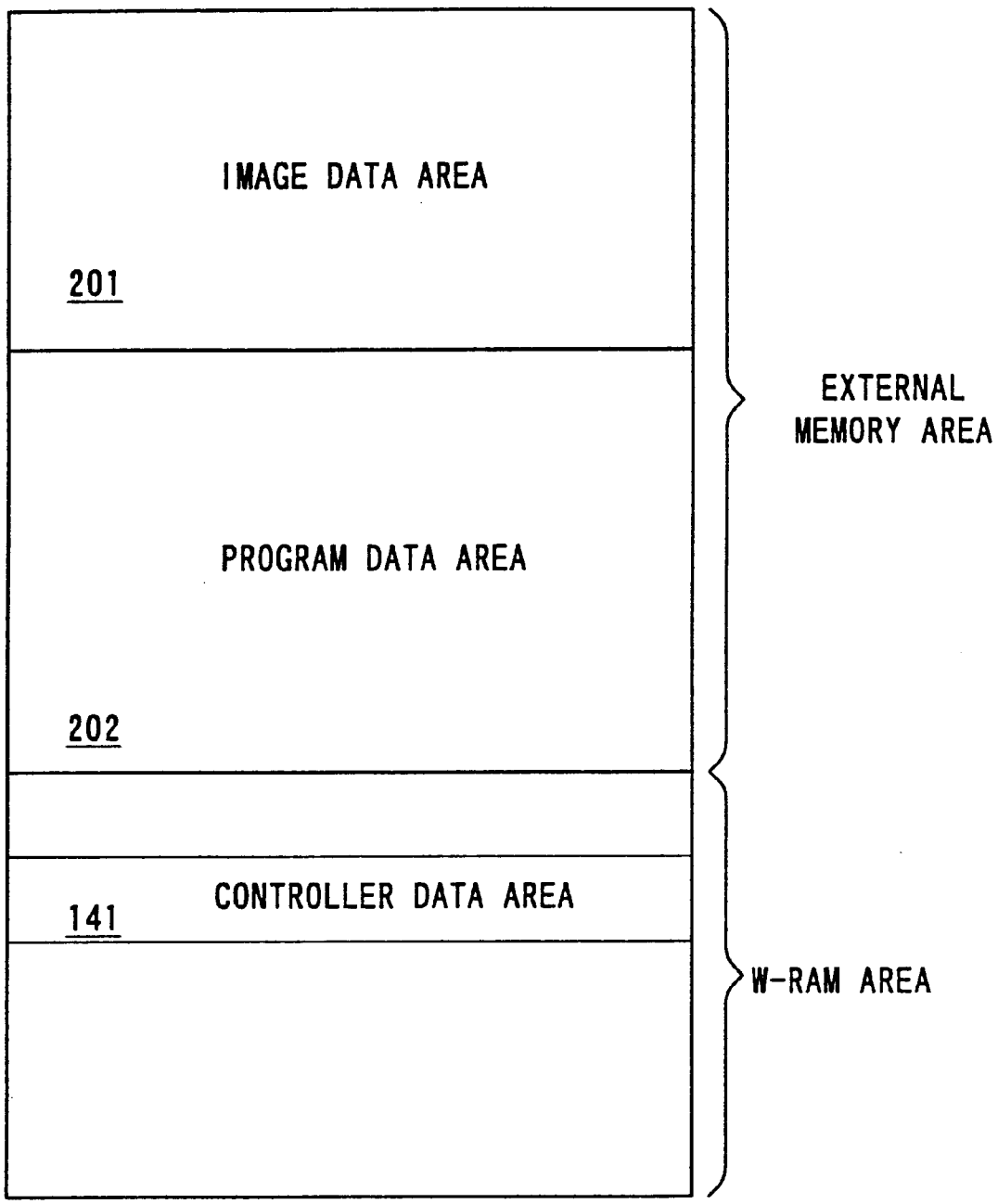
FIG. 6 is an illustrative view showing a memory map of a CPU of FIG. 5 embodiment, an external memory incorporated in a cartridge and a W-RAM being illustrated.

With referring to a detailed block diagram shown in FIG. 5, the cartridge 20, a monitor 30 (a television receiver, a CRT or the like) and the controllers 40 are connected to the image processor 10. The image processor 10 is provided with a CPU 11 which controls a progress of an image processing according to the program stored in advance in the external memory incorporated in the cartridge 20. The CPU 11 has a memory space as shown in FIG. 6, and the memory space includes the memory areas 201 and 202 both for the external memory included in the cartridge 20 and a memory area 141 for a W-RAM 14. Then, a bus control circuit 12 is connected to the CPU 11.

The bus control circuit 12 is connected to the cartridge connector 13, the W-RAM 14, a music signal generation circuit 15, and an image signal generation circuit 16 by a bus which is a parallel signal line, and to a controller control circuit 17 by a serial signal line. Furthermore, the bus control circuit 12 receives a command which is outputted from the CPU 11 in a bit-parallel signal via the bus, and converts the bit-parallel signal into a bit-serial signal so as to output the command by the serial signal to the controller control circuit 17. The bus control circuit 12 converts data of the serial signal inputted by the controller control circuit 17 into the parallel signal so as to output onto the bus. The data outputted to the bus is subjected to predetermined processing such as that the data is processed by the CPU 11 or that the data is stored in the W-RAM 14.

The cartridge 20 is connected to the cartridge connector 13, and the external ROM and the readable/writable memory within the cartridge and the bus control circuit 12 are connected to each other by an address bus and a data bus so as to transmit or receive data therebetween.

The W-RAM 14 is a memory for temporarily storing data to be processed by the CPU 11, and connected to the bus control circuit 12 via the address bus and the data bus such that the data can be read-out from the W-RAM 14 or written into the W-RAM 14 via the bus control circuit 12. Furthermore, a memory map of the W-RAM 14 includes a controller data area or control pad data area 141 as shown in the W-RAM area of FIG. 6.

The music signal generation circuit 15 is a circuit for generating a music signal via the bus control circuit 12 according to instructions of the CPU 11.

The image signal generation circuit 16 is a circuit for generating an image signal via the bus control circuit 12 according to instructions of the CPU 11.

The controller control circuit 17 is connected to the bus control circuit 12 and the controller connectors 181–184 so as to transmit or receive the data to or from the connectors 181–184 in a bit-serial fashion.

Figure 7:
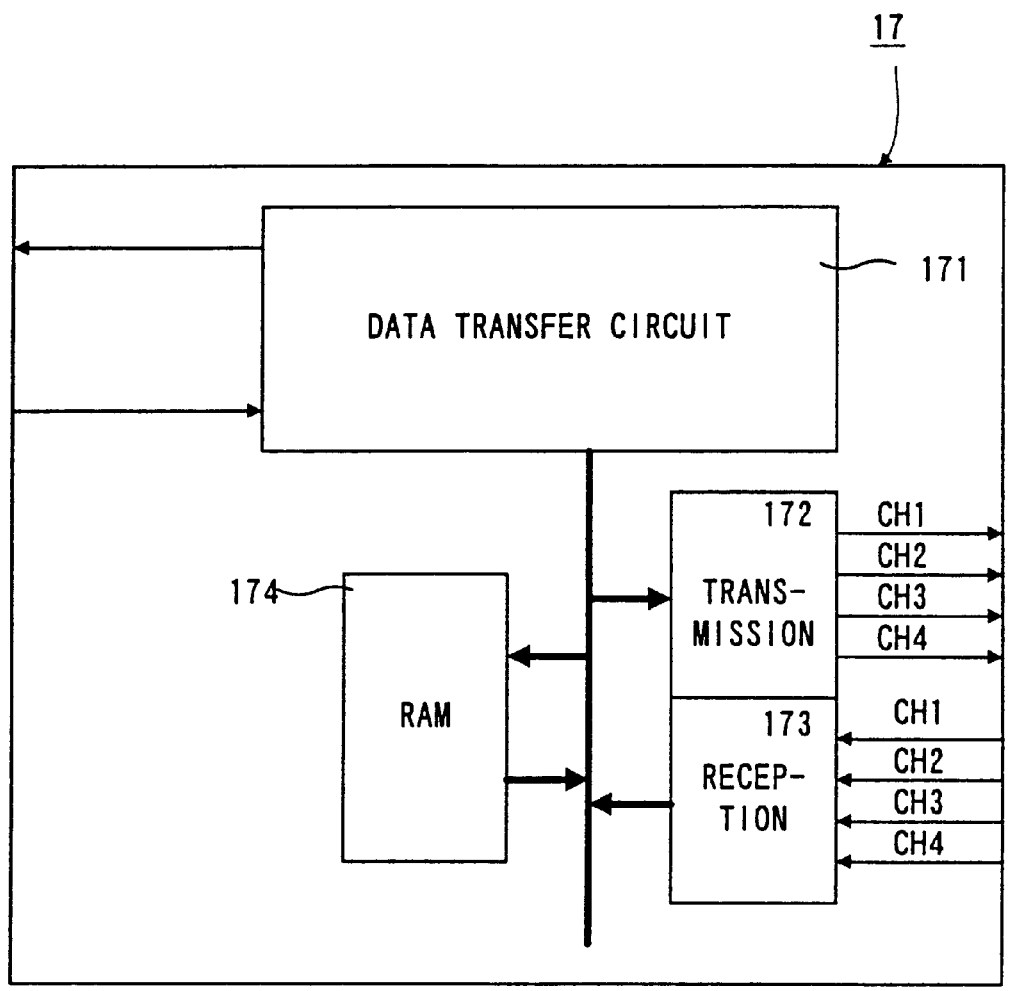
FIG. 7 is a block diagram showing in detail a controller control circuit in FIG. 5 embodiment.

Specific structure of the controller control circuit 17 will be described with referring to an internal block diagram shown in FIG. 7.

A data transfer control circuit 171 includes a parallel-serial conversion circuit and a serial-parallel conversion circuit, and receives serial data from the bus control circuit 12 by the serial-parallel conversion circuit, and transmits the serial data to the bus control circuit 12 by the parallel-serial conversion circuit 43. Furthermore, the data transfer control circuit 171 is connected to a transmission circuit 172, a reception circuit 173 and a RAM 174 via a bus. Therefore, the data transfer control circuit 171 transmits data to the RAM 174 or receives the data from the RAM 174 as parallel data. Accordingly, the data transfer control circuit 171 reads-out the data of the RAM 174 to transmit the same to the bus control circuit 12, and writes the data received from the bus control circuit 12 into the RAM on the basis of instructions from the bus control circuit 12.

The transmission circuit 174 converts the parallel signal from the bus into the serial signal so as to transmit the data. Signal lines CH1–CH4 are respectively connected to the controller connectors 181–184 so as to transmit the serial data to respective controllers 40.

The reception circuit 173 receives the serial signal from the controllers 40 and outputs the data as received to the bus as the parallel signal. The signal lines CH1–CH4 are respectively connected to the controller connectors 181–184 so as to receive the serial data from the controllers.

The RAM 174 is connected to the data transfer control circuit 171 via the bus, and capable of inputting and outputting the data in a form of the parallel signal. The data stored in the RAM 174 will be described with using a memory map shown in FIG. 8. A command for a first channel is stored in the area 1741, and transmission data and reception data for the first channel are stored in the area 1742. In the area 1743, a command for a second channel is stored, and transmission data and reception data for the second channel are stored in the area 1744. A command for a third channel is stored in the area 1745, and in the area 1746, transmission data and reception data for the third channel are stored. In the area 1747, a command for a fourth channel is stored, and in the area 1748, transmission data and reception data for the fourth channel are stored.

By constructing the data transfer control circuit 171 as described above, the data transfer control circuit 171 can transmit predetermined commands (instructions) from the transmission circuit 172 or store the data received by the reception circuit 173 into the RAM 174.

Each of the controller connectors 181–184 is connected to each of the controller control circuits 17 and detachably connected to the connection jack 41 of the controller 40. Furthermore, when the controller connectors 181–184 are connected to the connection jacks 41 of the controller 40, the controllers 40 and the controller connectors 181–184 are respectively electrically connected to each other, and therefore, it becomes possible to transmit and receive the data therebetween.

Figure 9:
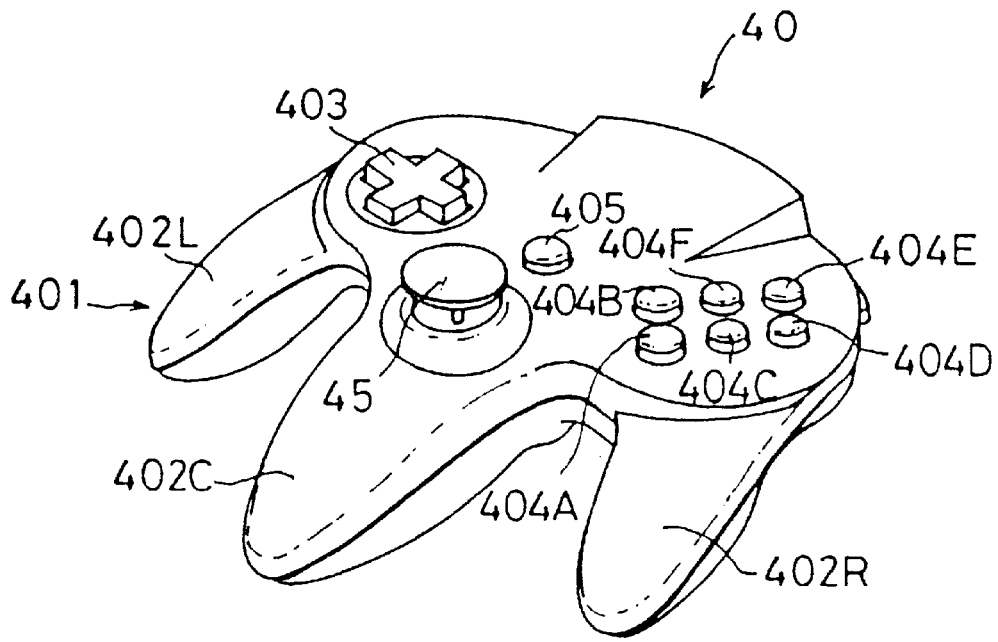
FIG. 9 is a perspective view showing a controller of FIG. 4 embodiment while the controller is viewed from above.
Figure 10:
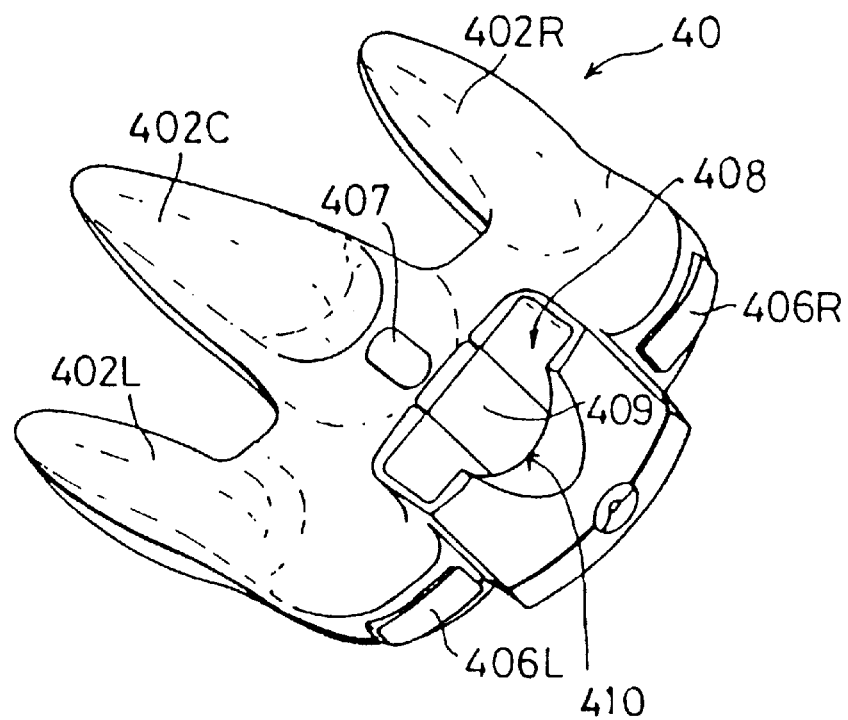
FIG. 10 is a perspective view showing the controller of FIG. 4 embodiment while the controller is viewed from below.

With referring to FIG. 9 and FIG. 10, the controller 40 of this embodiment shown includes a housing 401 consist of an upper half and a lower half. At both left and right ends of the housing 401, a left grip 402L and a right grip 402R are respectively formed in a manner that the same are protruded toward a front side. An intermediate position between the left grip 402L and the right grip 402R, a center grip 402C is formed in a manner that the same is protruded toward the front side. A cross-direction designation switch 403 which is a digital joystick is formed on a surface of the housing 401 in the vicinity of a base end of the left grip 402L. Action designation switches 404A, 404B, 404C, 404D, 404E and 404F which designate six (6) kinds of actions are respectively formed on the surface of the housing 401 in the vicinity of a base end of the right grip 402R.

An analog joystick 45 which is capable of designating all directions within 360 degrees is formed on the housing 401 in the vicinity of a base end of the center grip 402C. At an approximately central position of the housing 401, a start switch 405 which designates a start of a game is formed. Furthermore, the start switch 405 is positioned at an approximately center of an area surrounded by the switches 403 and 404A to 404F, and the analog joystick 45.

Furthermore, a pair of side surface switches 406L and 406R are formed on a rear surface of the housing 401, and a bottom surface switch 407 is formed at an approximately center of the lower half in the vicinity of the base end of the center grip 402C.

A rear surface of the lower half is extended toward direction of a bottom surface, and an opening portion 408 is formed at a tip end thereof. In an interior of the opening portion 408, a connector (not shown) to which an expansion cartridge 50 shown in FIG. 4 is connected is provided. Furthermore, a lever 409 for discharging the cartridge 50 inserted into the opening portion 408 is formed at a position of the opening portion 408. In addition, at a side opposite to the lever of the opening portion 408 to which the above described expansion cartridge 50 is inserted, a notch 410 is formed, and the notch 410 secures a space for withdrawing the expansion cartridge 50 in discharging the expansion cartridge 50 with utilizing the lever 409.

Now, with referring to FIG. 11 to FIG. 15, the analog joystick 45 will be described in detail. The analog joystick 45 is constructed as a joystick unit shown in FIG. 11. The joystick unit is sandwiched by the upper half and the lower half of the housing 401. The joystick unit includes a housing formed by a case 451 and a cover 452, and an inner case 453 are accommodated within the housing.

Figure 12:
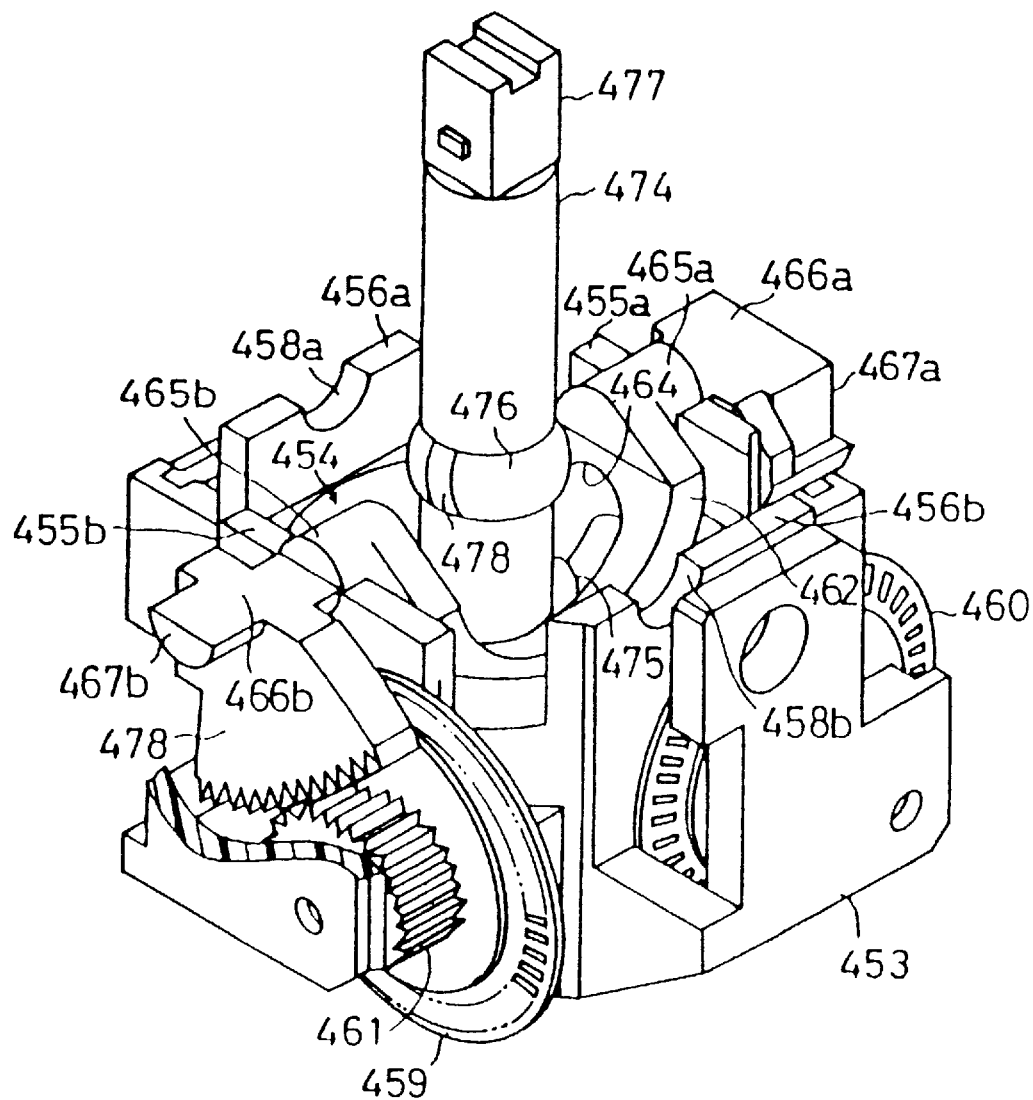
FIG. 12 is a perspective view showing major portions of FIG. 11 unit.
Figure 13:
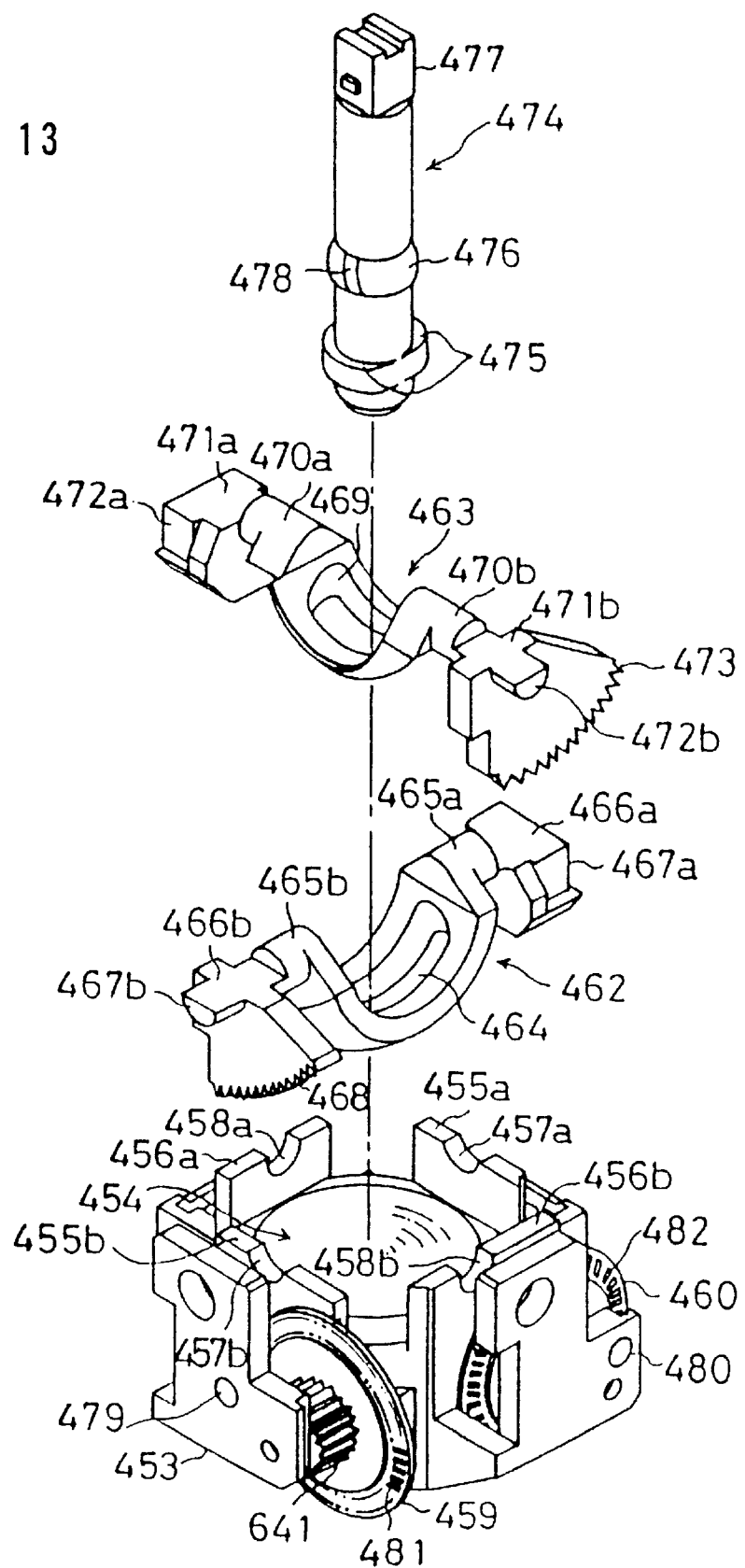
FIG. 13 is a fragmentary perspective view showing major portions of FIG. 11 unit.

As shown in FIG. 12 and FIG. 13, the inner case 453 includes a bowl-shaped recess portion 454 formed at a center of the inner case 453, and there are provided with two pairs of support plates 455a and 455b, and 456a and 456b around the recess portion 454 with angle-interval of 90 degrees, and semicircular bearings 457a and 457b, and 458a and 458b are formed on the support plates 455a and 455b, and 456a and 456b, respectively. The bearings 457a and 457b or 458a and 458b are arranged on the same axis line, and axes of the bearings 457a and 457b, and 458a and 458b are at the same height level, and orthogonally intersected to each other. Wheels 459 and 62 having rotation shafts which are orthogonally intersected to each other are rotatably supported at a side surface of the inner case 453, and gears 461 are uniformly formed on the respective wheels 459 and 460.

The analog joystick unit further includes swingable members 462 and 463. One swingable member 462 is formed by an arc-like member which is provided with a long hole 464 being made long in a longitudinal direction of the arc-like member, and supporting shafts 465a and 465b are formed at both ends of the swingable member 462, and shaft end portions 467a and 467b respectively having flat surfaces 466a and 466b are extended from the supporting shafts 465a and 465b, and a sector gear 468 is provided on one shaft end portion 467b. The other swingable member 463 is different from the one swingable member 462 in a point that the swingable member 463 is constructed by an arc-like member having a radius of curvature smaller than that of the swingable member 462; however, in other points, the swingable member 463 is constructed in a manner similar to or the same the swingable member 462. That is, a reference numeral 469 denotes a long hole, reference numerals 470a and 470b denote supporting shafts, reference numerals 471a and 471b denote flat surfaces, reference numerals 472a and 472b denote shaft end portions, and a reference numeral 473 denotes a sector gear.

The supporting shafts 465a and 465b, and 470a and 470b are individually inserted into the two sets of bearings 457a and 457b, and 458a and 458b of the inner case 453, and therefore, the pair of swingable members 462 and 463 can be supported in a swing-free fashion, and the swingable members 462 and 463 are arranged in a state where longitudinal directions of the long holes 464 and 469 are orthogonally intersected to each other and overlaid with an interval or gap. In the pair of swingable members 462 and 463 thus attached to the inner case 453, the sector gears 468 and 469 bite the above described gears 461. Furthermore, respective ones of the above described flat surfaces 466a and 466b, and 471a and 471b are included in the same horizontal plain in a neutral state of a lever 474 (described later).

As shown in FIG. 13, the lever 474 includes protrusions 475 which are protruded toward outer radius directions at one end of the lever 474, and a ball portion 476 at a middle portion of the lever 474, and a connection portion 477 at the other end of the lever 474. Grooves 478 which are extended in a latitude direction at positions apart from each other by 180 degrees are formed on the above described ball portion 476. A diameter of the lever 474 is selected at a size which is not larger than sizes of short directions of the long holes 464 and 469 formed on the swingable members 462 and 463. Preferably, the diameter of the lever 474 is selected at a size by which the lever 474 can be slidably inserted into the long holes 464 and 469 with no shake. Then, the one end portion of the lever 474 is penetrated through the long holes 464 and 469, and the protrusions 475 are fit into the long hole 464 of a lower side swingable member 462. Therefore, the protrusions 475 of the lever 474 become to be protruded in a direction orthogonally intersected to the longitudinal direction of the long hole 469 of an upper swingable member 463 being attached to the inner case 453, and therefore, if the lever 474 is pulled-up, the protrusions 475 are prevented from being slipped-off by the upper swingable member 463.

Figure 11:
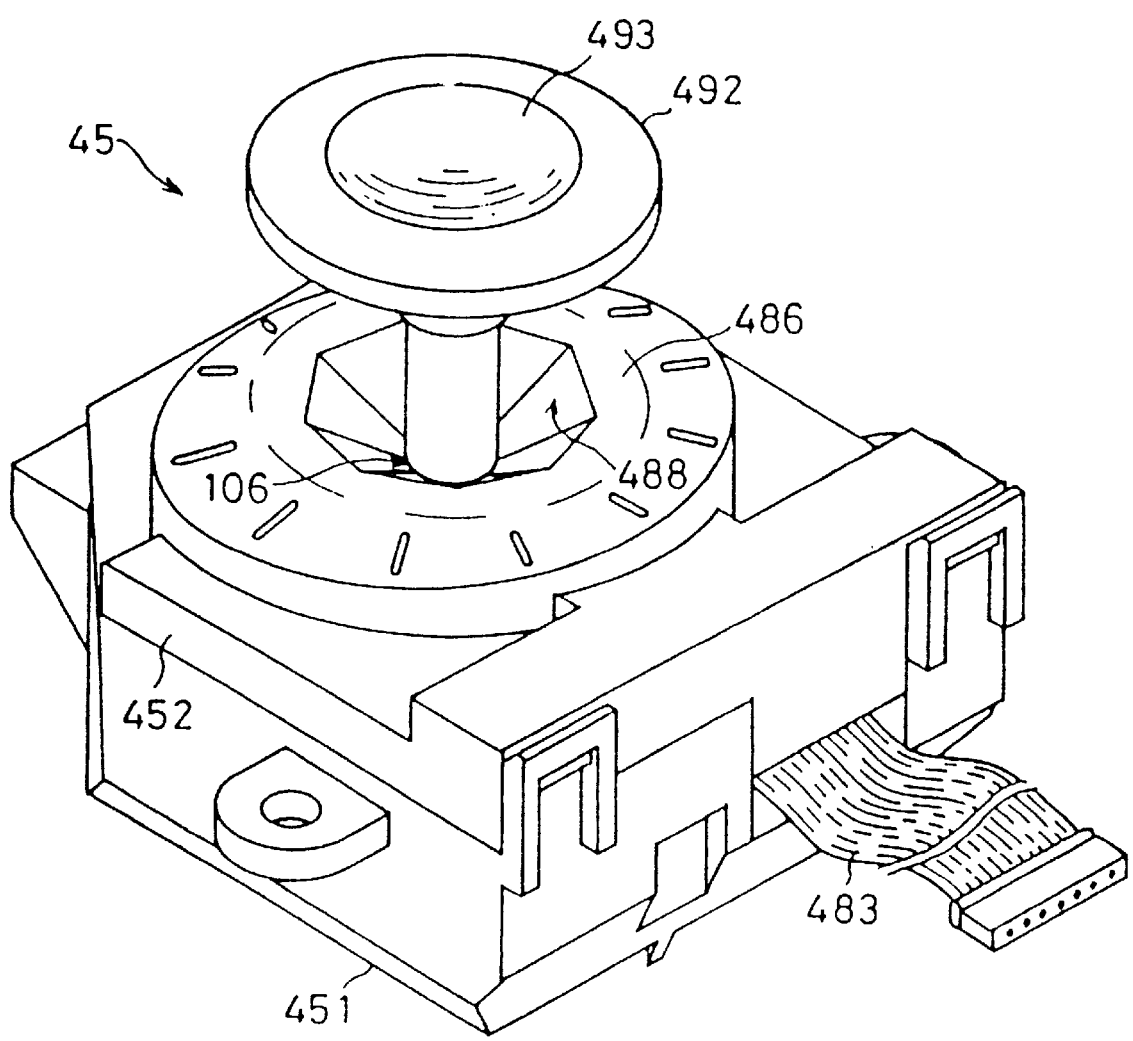
FIG. 11 is a perspective view showing an analog joystick unit capable of being utilized in the embodiment.

A mechanical structural portion assembled as shown in FIG. 12 is accommodated within the outer case 451 shown in FIG. 11. At this time, the inner case 453 is fixed to the outer case 451 by a suitable means such as screws (not shown).

Then, as well seen from FIG. 13, there are provided on the inner case 453 photo-interrupters 479 and 480 which are opposite to the two wheels 459 and 460. The photo-interrupters 479 and 480 respectively include light-emitting elements and light-receiving elements (both not shown), and lights emitted by the light-emitting elements are received by the light-receiving elements through slits 481 and 482 respectively formed on the wheels 459 and 460. Therefore, the photo-interrupters 479 and 480 respectively detect the slits 481 and 482, and in response to the slits 481 and 482, outputs pulse signals according to rotations of the wheels 459 and 460.

In addition, the height level of swing-shafts (supporting shafts 465 and 470) of the swingable members 462 and 463 are coincident with a height level of a center of the ball portion 476 of the lever 474. Furthermore, a printed-circuit board (not shown) to which a flexible wiring plate 483 is connected is assembled in the outer case 451, and the light-emitting elements and the light-receiving elements included in the photo-interrupters 479 and 480 are electrically connected to printed patterns of the board.

Figure 14:
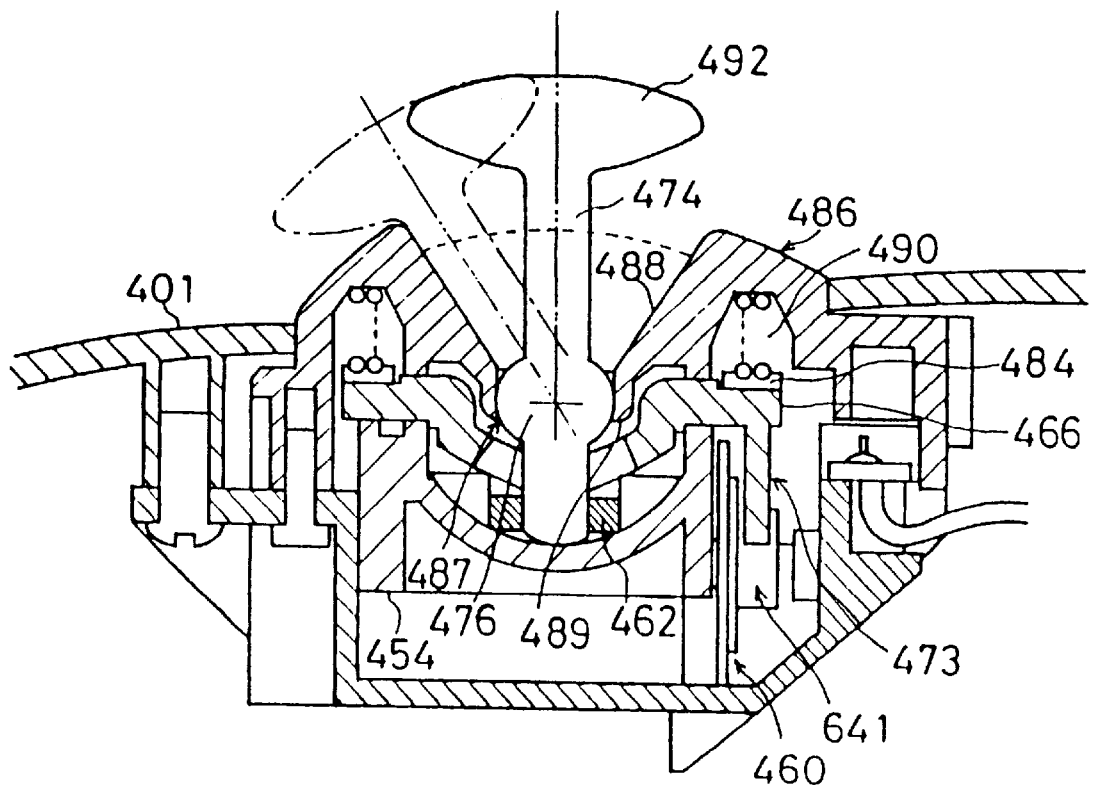
FIG. 14 is an illustrative view showing in cross-section major portions of FIG. 11 unit.

As shown in FIG. 14, a ring with groove 484 is supported above the flat surfaces 466 and 471 provided on the pair of swingable members 462 and 463, and a coil spring 485 is arranged above the ring with groove 484. The ring with groove 484 is one example of a pushing-down member, and in the neutral state of the lever 474, a lower surface of the ring 484 becomes in horizon, and the lower surface of the ring 484 and the above described flat surfaces 466 and 471 are brought into surface-contact with each other.

As shown in FIG. 14, a guide portion or ring 486 is attached to the cover 452, and a circular hole 487 is formed at a center portion of the guide ring 486. The guide ring 486 further includes a guide wall 488 which is a rising slope raised from an inner periphery defining the hole 487 toward an outer periphery of the guide ring 486. That is, the guide wall 488 is formed as a whole in "an earthenware mortar" or "cone"-shape. Then, in viewing the guide wall 488 from above, the guide wall 488 has an outer edge 491 which becomes octagonal as shown in FIG. 10.

In addition, a diameter of the hole 487 is selected to a size that is the same or approximately same as a diameter of an outer peripheral surface of the ball portion 476 of the above described lever 474. Therefore, as shown in FIG. 9, the inner edge defining the hole 487 is brought into contact with the ball portion 476 of the lever 474, and therefore, the lever 474 is supported by the ball portion 476 and the hole 487 in a manner that the lever 474 can be swung or inclined in any directions. Furthermore, circular bosses 489 are formed at two positions apart from each other by 180 degrees on the inner edge defining the hole 487 of the guide ring 486 in a manner that the bosses 489 are protruded toward an inner radius direction of the hole 487, and the bosses 489 individually fit into the grooves 478 formed in the latitude direction of the above described ball portion 476. Therefore, the lever 474 can be swung around an axis of the bosses 489, but the lever 474 can not be rotated around the axis of the lever 474 itself. Therefore, the lever 474 is prevented from being rotated around its axis by the grooves 478 of the ball portion 476 and the bosses 489.

Furthermore, if the cover 452 is attached to the case 451, a spring 490 is sandwiched and compressed between the ring with groove 484 and the cover 452. Therefore, the flat surfaces 466 and 471 of the pair of swingable members 462 and 463 are always depressed by a force of the spring 490 via the ring with groove 484, and by such a depressing operation, the pair of swingable members 462 and 463 are always elastically biased so as to become an attitude that both members 462 and 463 are not included in any directions, and therefore, the lever 474 becomes in a vertical attitude, that is, the lever 474 becomes in a state where the lever 474 is always elastically biased into the neutral state thereof.

The lever 474 is provided with an operating knob 492 which is attached to the lever 474 via the connection portion 477. On an upper surface of the operating knob 492, a recess portion 493 is formed such that a finger of the hand can be easily put on the knob 492.

In the above described analog joystick unit, according to an inclined direction and an inclined angle of the lever 474, the swingable members 462 and/or 463 are swung, and then, the wheels 459 and/or 460 are rotated in accordance with the inclined angle of the swingable members 462 and/or 463, and therefore, pulses according to rotation amounts of the wheels 459 and/or 460 are outputted, and the pulses are utilized as coordinate signals in an X axis and/or Y axis directions.

Figure 15:
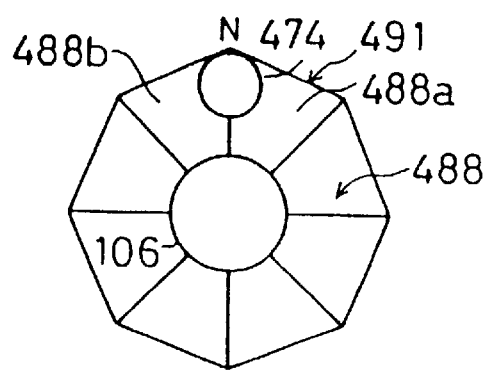
FIG. 15 is an illustrative view showing a state where a lever is guided by a guide ring.

Now, the guide ring 486 will be described in detail. As described above, the guide ring 486 includes the guide wall 488 having the octagonal outer edge 491 in viewing the guide ring 484 from above as shown in FIG. 15. Respective corners of the octagonal outer edge 491 function as recess portions which receive the lever 474 as shown in FIG. 15. Therefore, in this embodiment shown, the respective corners are positioned at eight positions with intervals of 45 degrees of upper (North), lower (South), left (West), right (East), a center position between upper and left (North-West), a center position between upper and right (North-East), a center position between lower and left (South-West) and a center position between lower and right (South-East). As to a point N indicative of upper (North) shown in FIG. 15, guide walls 488a and 488b which sandwich the point N are converged at the point N. That is, the both guide walls 488a and 488b are intersected to each other, and a position that the both are intersected to each other is the point N. Therefore, if the lever 474 is inclined toward the point N, the lever 474 is moved along with the guide walls 488a and 488b sandwiching the point N, that is, the lever 474 is guided by the guide walls 488a and 488b, and finally, positioned at the point N. Therefore, at a time that the movable character (not shown) on the monitor (not shown) is intended to be moved upward, for example, that is, at a time that the movable character is to be moved in a straight-going direction of the movable character, the lever 474 may be inclined toward the point N. That is, when the movable character is to be advanced straight, if the lever 474 is inclined toward a vicinity of the point N, the lever 474 is restricted at the point N along with the guide walls 488a and 488b adjacent to the point N, and therefore, only by holding such a state, it is possible to surely advance the movable character straight-on.

Furthermore, as a method for detecting rotations of the wheels 459 and 460, one example that the slits 481 and 482 are detected by the photo-interrupters 479 and 480 was described; however, another method may be utilized. For example, it is possible to utilize a method in which a plurality of conductive members are formed on each of the wheels 459 and 460, and by electrically detecting the conductive members, a rotation of each of the wheels 459 and 460 can be detected.

Figure 16:
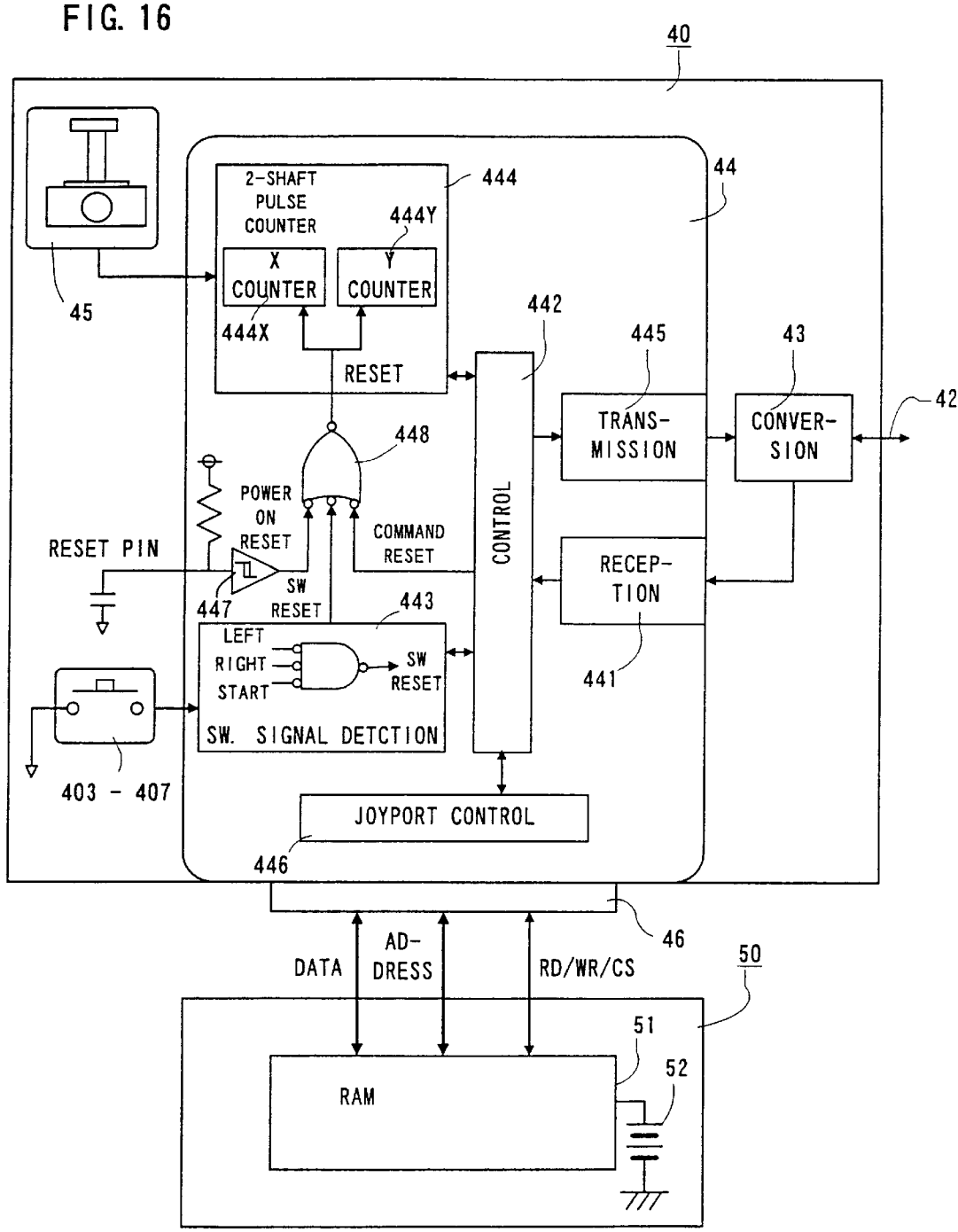
FIG. 16 is a block diagram showing in detail the controller and an expansion device.

Next, the controller 40 connected to the connector 181 will be described with utilizing a detailed block diagram shown in FIG. 16.

The controllers 40 connected to the aforementioned controller connectors 182–184 is the same as the controller 40 connected to the controller connector 181, and therefore, a description will be omitted here.

The connection jacks 41 are connected to the controller connectors 181–184, respectively, and output the data transmitted from the image processor 10 to the conversion circuit 43.

The conversion circuit 43 transmits/receives the data of the controller control circuit 17 included in the image processor 10 via the cable 42 in a bit-serial signal. More specifically, the conversion circuit 43 transmit the serial data sent from the controller control circuit 17 to a reception circuit 441 within the controller circuit 44 as the serial signal, and receives the serial signal from a transmission circuit 445 within the controller circuit 44 and outputs the serial signal to the controller control circuit 17 via the cable 42.

The controller circuit 44 includes the reception circuit 441, a control circuit 442, a switch signal detection circuit 443, a counter 444, the transmission circuit 445 and a joyport control circuit 446. The transmission circuit 445 converts the parallel signal outputted from the control circuit 442 into the serial signal so as to output to the conversion circuit 43. The reception circuit 441 converts the serial signal outputted from the conversion circuit 43 into the parallel signal so as to output to the control circuit 442.

The control circuit 442 receives the data outputted from the image processor 10 when the parallel signal from the reception circuit 441 is inputted thereto, and performs predetermined operations based upon the data as received. The control circuit 442 instructs the switch signal detection circuit 443 to detect a switch signal, and receives from the switch signal detection circuit 443 data representing which button(s) is depressed. Furthermore, the control circuit 442 instructs the counter 444 to output data, and receives data of the X counter 444X and the Y counter 444Y. The control circuit 442 is further connected to the joyport control circuit 446 via the address bus and the data bus, and by outputting instruction data to the joyport control circuit 446, the control circuit 442 can control the expansion device 50 and receive data outputted from the expansion device 50.

The switch signal detection circuit 443 receives switch signals from the buttons 403–407, and detects that a plurality of predetermined buttons are simultaneously depressed, and transmits a reset signal to a reset circuit 448. Furthermore, the switch signal detection circuit 443 outputs the switch signals to the control circuit 442.

The counter circuit 444 includes two counters. One is the X counter 444X which counts a detection signal (pulse signal) outputted from an X axis photo-interrupter 479 in the joystick 45, whereby it is possible to detect how much the lever 474 is inclined in the X axis direction. The other is the Y counter 444Y which counts the pulse signal outputted from the Y axis photo-interrupter 480 of the joystick 45, whereby it is possible to detect how much the lever or operating portion is inclined in the Y axis direction. The counter circuit 444 outputs count values counted by the X counter 444X and the Y counter 444Y to the control circuit 442 in response to an instruction by the control circuit 442.

The joyport control circuit 446 is connected to the expansion device 50 by the address bus and the data bus via the control circuit 442 and the joyport connector 46. Therefore, the control circuit 442 and the expansion device 50 become to be connected to each other by the address bus and the data bus, and accordingly, the expansion device 50 can be controlled by the instructions from the CPU 11 of the image processor 10.

Each of the buttons 403–407 generates an electrical signal in response to a depression of a key top protruded outside the controller 40 by the operator. In this embodiment, when the key is depressed, a voltage changed from a high level to a low level. Such a change of the voltage is detected by the switch signal detection circuit 443.

With referring to FIG. 17, data of the controller 40 will be described. The data generated by the controller 40 is 4 bytes including B, A, G, START, upper, lower, left, right, JSRST, 0 (not used in the embodiment), L, R, E, D, C, F, X ordinate and Y ordinate, and each bit is represented by "0" or "1". B corresponds to the button 404B and becomes "1" when the button 404B is depressed by the operator and "0" when the button 404B is not depressed. Similarly, A, G, START, upper, lower, left and right, L, R, E, J, C and F correspond to the buttons 404A, 407, 405, 403, 406L, 406R, 404E, 404D, 404C and 404F, respectively. JSRST becomes "1" when the buttons 405, 406L and 406R are simultaneously depressed by the operator, and "0" when these buttons are not simultaneously depressed by the operator. The X ordinate and the Y ordinate are the data of the count values of the X counter 444X and the Y counter 444Y.

Next, the expansion device 50 will be described. One example of the expansion device 50 shown in FIG. 16 is a back-up memory card 50. The back-up memory card 50 includes a readable/writable RAM 51 that the data can be written in or read from a desired address by designating the address, and a battery 52 which supplies a back-up power source necessary for saving the data of the RAM 51. Then, by connecting the back-up memory card 50 to the joyport connector 46 of the controller 40, the RAM 51 is electrically connected to the joyport control circuit 446, and therefore, the data can be transmitted/received between the RAM 51 and the controller 40. Transmission/reception of the data will be described later in detail.

In the above described embodiment, the back-up memory card 50 is described as an example of the expansion device; however, an arbitrary device can be applied to the expansion device if the arbitrary device can operate by transmitting the data or receiving the data.

Next, operations concerning with data transmission/reception between the image processor 10 and the controller 40.

Figure 1:
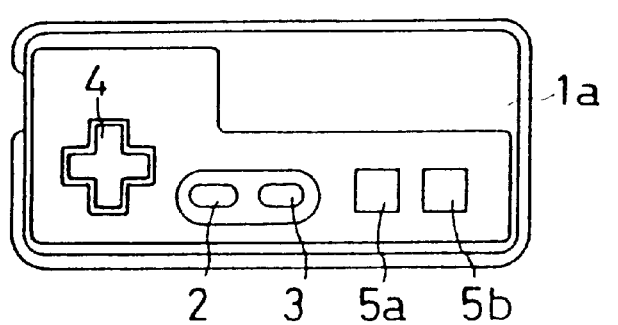
FIG. 1 is an illustrative view showing the first prior art.
Figure 2:
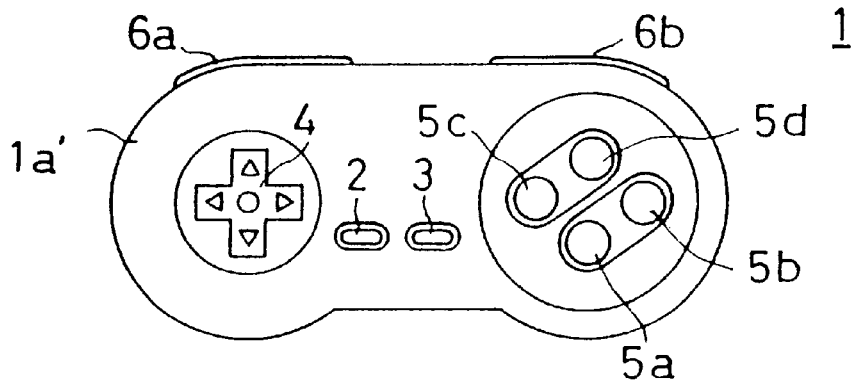
FIG. 2 is an illustrative view showing the second prior art.
Figure 3:
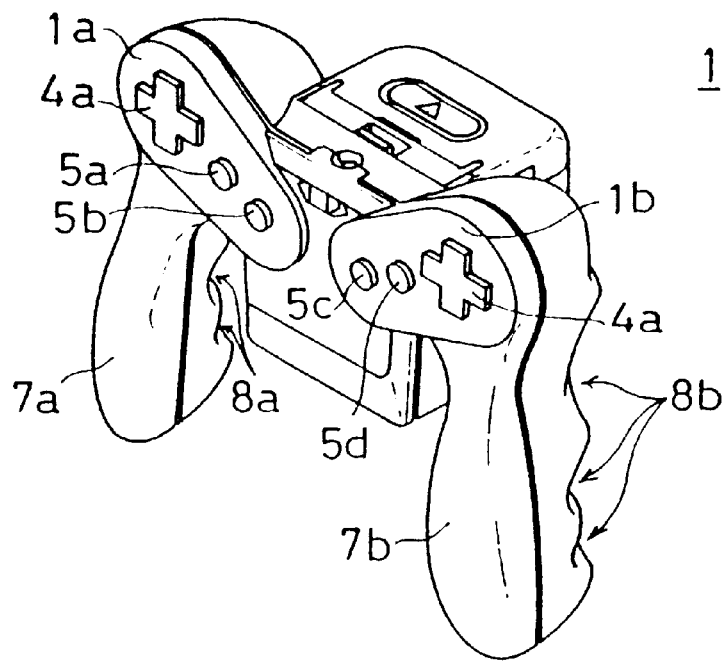
FIG. 3 is an illustrative view showing the third prior art.
Figure 18:
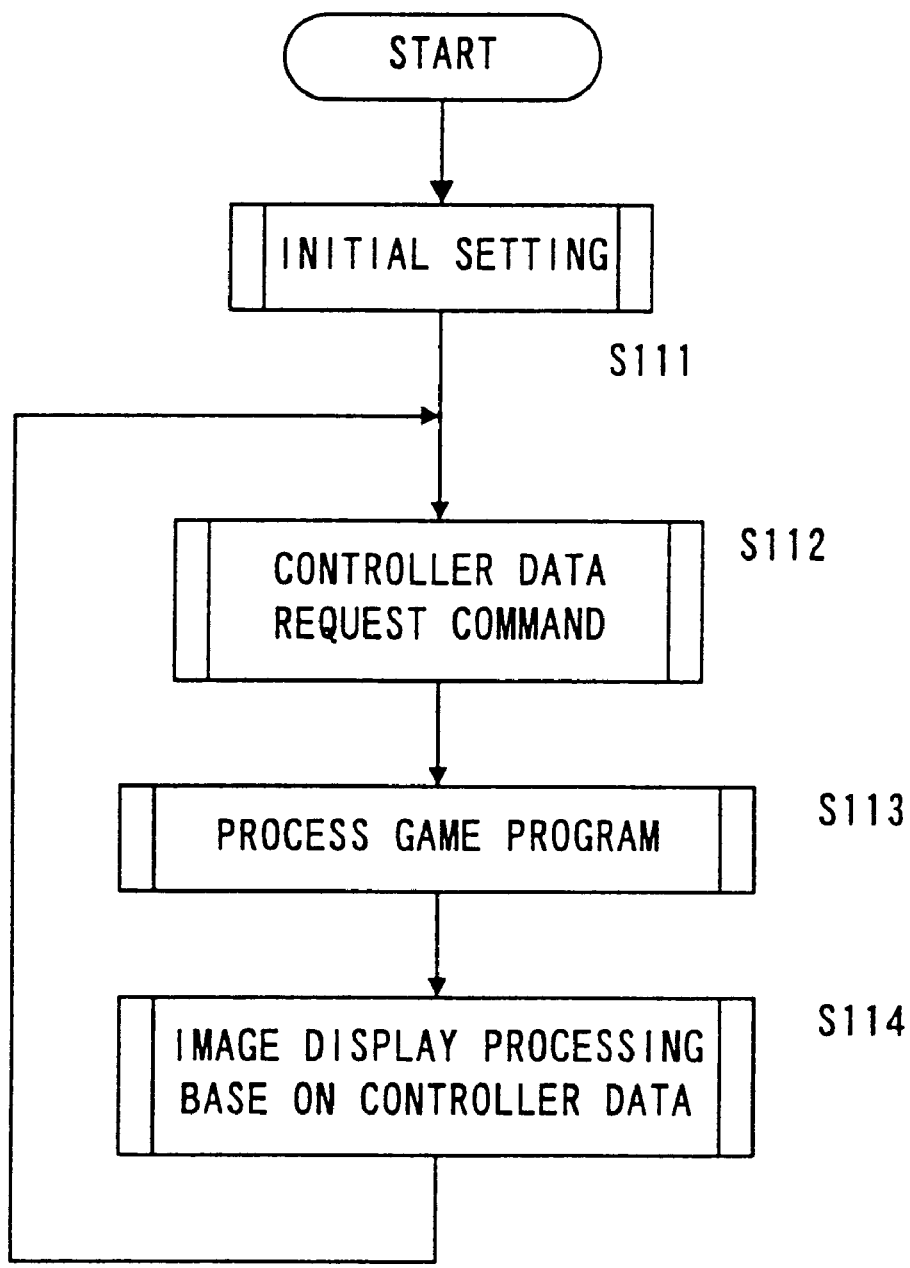
FIG. 18 is a flowchart showing an operation of the CPU in FIG. 5 embodiment.

First, with referring to a flowchart that is shown in FIG. 18 and for the CPU 11 of the image processor 10, an image processing operation will be described. In a step S111, the CPU 11 performs an initial setting on the basis of initial values (not shown) stored in the program data area 202 shown in FIG. 5. Next, in a step S112, the CPU 11 outputs a controller pad data to controller data request command being stored in the program data area 202 to the bus control circuit 12. Next, in a step S113, the CPU 11 performs a predetermined image processing operation on the basis of the program being stored in the program data area 202 and the data stored in the image data area 201 shown in FIG. 5. Furthermore, during the step S113 is executed by the CPU 11, the bus control circuit 12 executes steps S121–S124. Next, in a step S114, the CPU 11 outputs the image data on the basis of the control pad data or controller data being stored in the control pad data or controller data area 141 shown in FIG. 3. After the step S114, the CPU 11 repeatedly executes the steps S112 to S114.

An operation of the bus control circuit 12 will be described with referring to FIG. 19. In the step S121, the bus control circuit 12 determines whether or not the controller data request command (a request instruction for the switch data of the controller 40 or the data of the expansion device 50) is outputted by the CPU 11. If no controller data request command is outputted, the bus control circuit 12 waits for the command. If the controller data request command is outputted, a process proceeds to the step S122 wherein the bus control circuit 12 outputs a command for reading the data of the controller 40 into the controller control circuit 17. Next, in the step S123, the bus control circuit 12 determines whether or not the data of the controller 40 is received by the controller control circuit 17 and stored in the RAM 174. The bus control circuit 12 waits in the step S123 if the controller control circuit 17 receives no data from the controller 40 and no data is stored in the RAM 174. If the data from the controller 40 is received by the controller control circuit 17 and stored in the RAM 174, the process proceeds to the step S124. In the step S124, the bus control circuit 12 transfers the data of the controller 40 being stored in the RAM 174 of the controller control circuit 17 to the RAM 14. The bus control circuit 12 returns to the step S121 after the data transfer to the RAM 14, and repeatedly executes the steps S121–S124.

Figure 19:
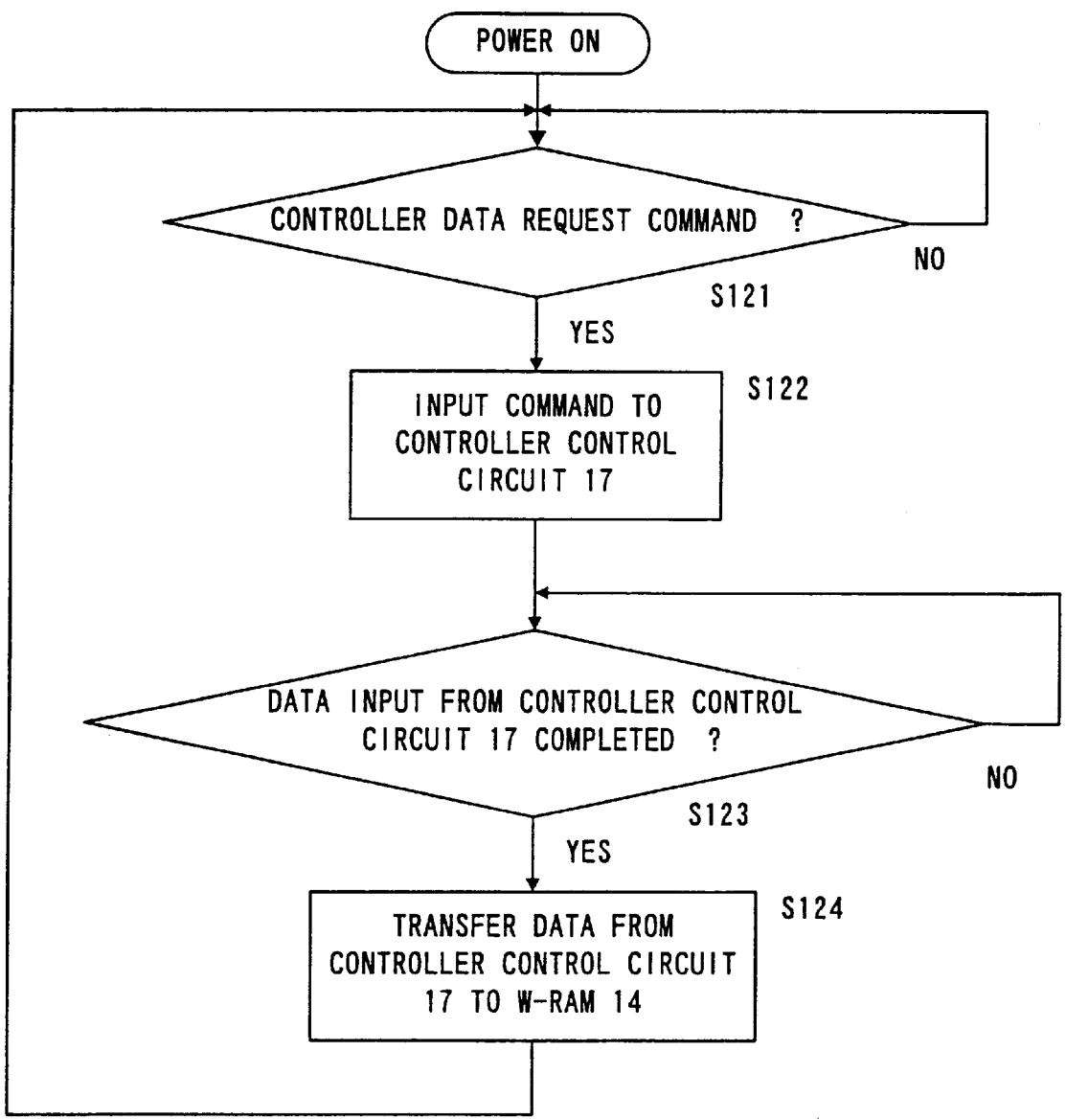
FIG. 19 is a flowchart showing an operation of a bus control circuit of FIG. 5 embodiment.

In addition, in the flowcharts of FIGS. 18 and 19, one example that the CPU 11 processes the data stored in the W-RAM 14 after the data is transferred from the RAM 174 to the W-RAM 14 by the bus control circuit 12; however, the data in the RAM 174 may be directly processed by the CPU 11 via the bus control circuit 12.

Figure 20:
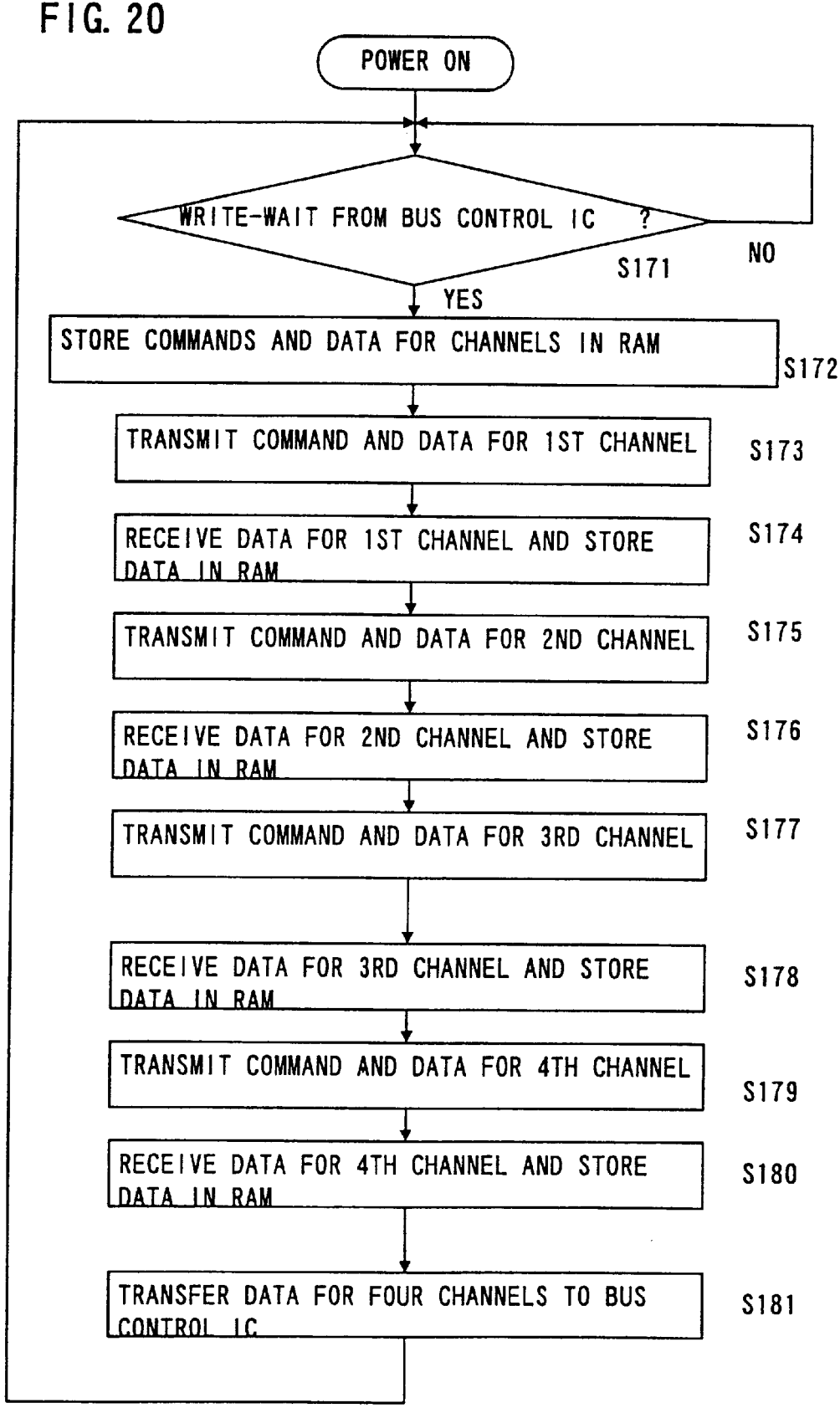
FIG. 20 is a flowchart showing an operation of the controller control circuit of FIG. 5 embodiment.

Now, an operation concerning with the data transfer will be described with referring to a flowchart of FIG. 20 showing an operation of the controller control circuit 17. In a step S171, it is determined whether or not the writing of the data from the bus control circuit 12 is waited-for. If not a waiting state, the data transfer control circuit 171 waits for the data to be written from the bus control circuit 12. If the data to be written from the bus control circuit 12 exists, in a next step S172, the data transfer control circuit 171 stores the commands and/or data (hereinafter, simply called as "commands/data") for the first to fourth channels in the RAM 174.

In a step S173, the commands/data of the first channel are transmitted to the controller 40 being connected to the connector 181. The control circuit 442 of the controller 40 performs a predetermined operation on the basis of the commands/data, and outputs data to be transmitted to the image processor 10. A content of the data will be described later in describing an operation of the control circuit 442. In a step S174, the data transfer control circuit 171 receives the data outputted from the control circuit 442, and stores the data in the RAM 174.

In a step S175, the commands/data of the second channel are transmitted to the controller 40 being connected to the connector 182. The control circuit 442 of the controller 40 performs a predetermined operation on the basis of the commands/data, and outputs data to be transmitted to the image processor 10. A step S176 is similar to the step S174.

In a step S177, the commands/data of the third channel are transmitted to the controller 40 being connected to the connector 183. The control circuit 442 of the controller 40 performs a predetermined operation on the basis of the commands/data, and outputs data to be transmitted to the image processor 10. A step S178 is similar to the step S174.

In a step S179, the commands/data of the fourth channel are transmitted to the controller 40 being connected to the connector 184. The control circuit 442 of the controller 40 performs a predetermined operation on the basis of the commands/data, and outputs data to be transmitted to the image processor 10. A step S180 is similar to the step S174.

In a succeeding step S181, the data transfer control circuit 171 transfers the data received in the steps S174, S176, S178 and S180 together to the bus control circuit 12.

Figure 21:
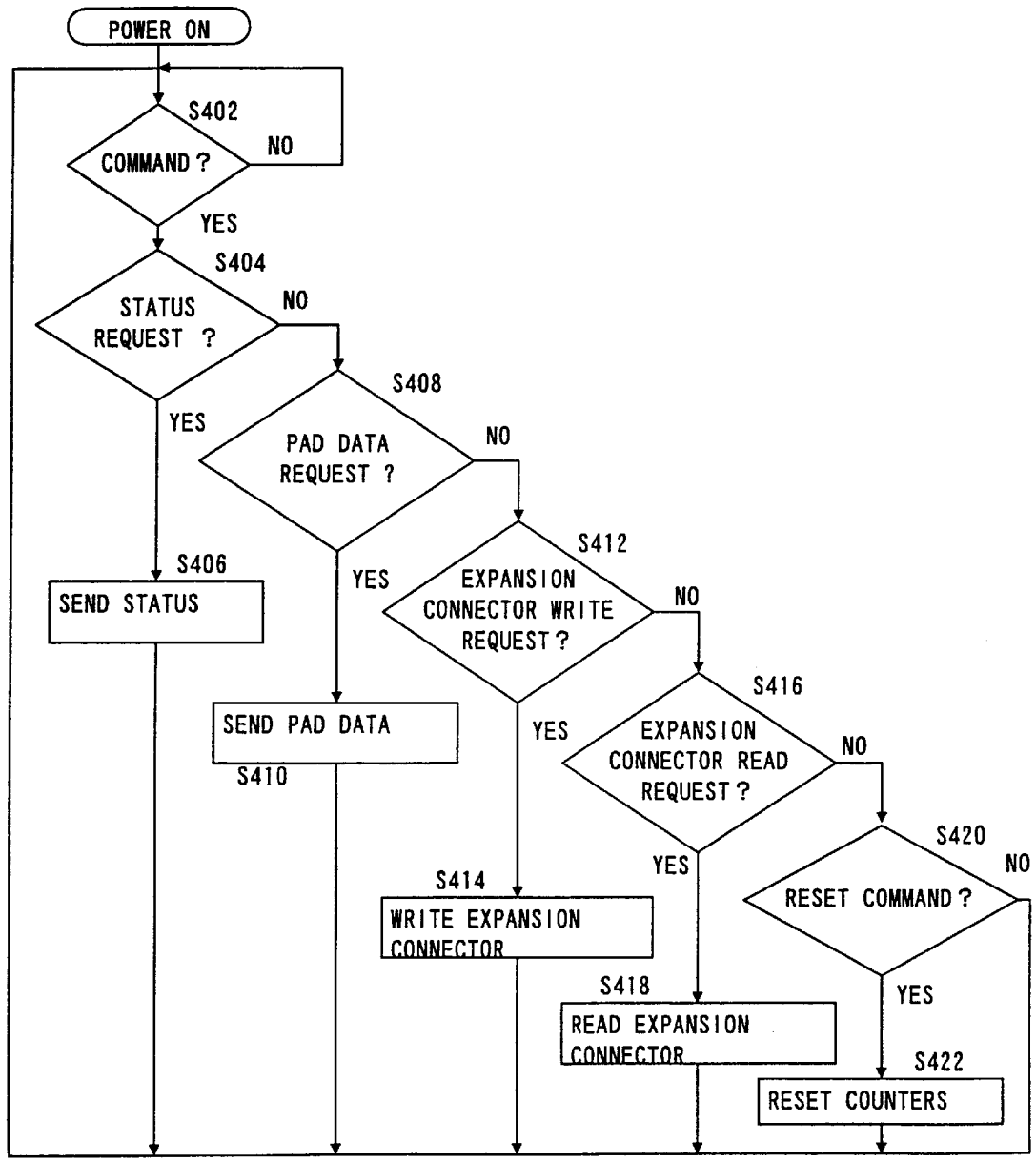
FIG. 21 is a flowchart showing an operation of a controller circuit of FIG. 5 embodiment.
Figure 22:
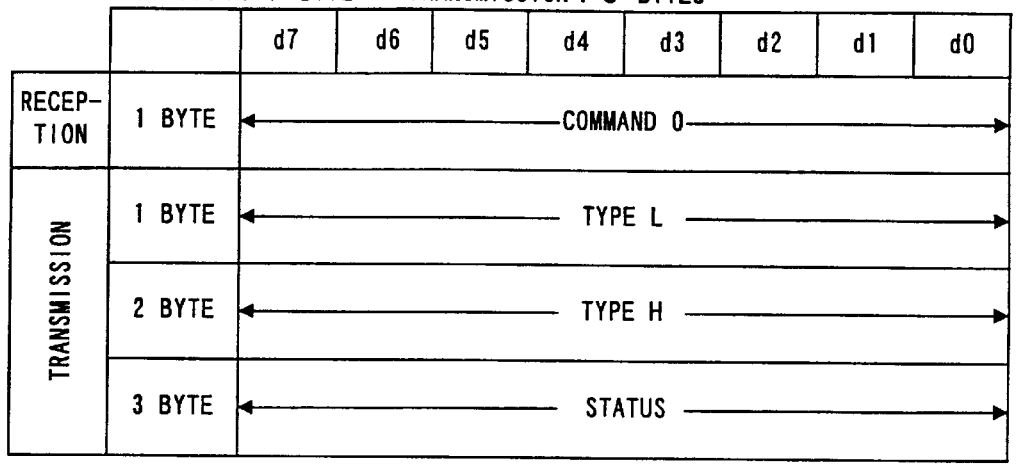
FIG. 22 is an illustrative view showing transmission/reception data of a control circuit at a time that command "0" is transmitted from the controller control circuit.

Next, FIG. 21 shows an operation flowchart of the controller circuit 44 in the controller 40. First, in a step S402, it is determined whether or not a command is inputted to the control circuit 442 from the image processor 10. If the command is not inputted, the control circuit 442 waits for the command. If the command is inputted, a process proceeds to a next step S404 wherein it is determined whether or not the command as inputted to the control circuit 442 is a status request command (command "0"). If not command "0", the process proceeds to a step S408. If command "0", the process proceeds to a step S406 to perform a status transmission processing. A detailed operation will be described with referring to FIG. 22 which shows in detail transmission/reception data between the image processor and the controller 40 in a case where the CPU 11 outputs command "0".

If the control circuit 442 of the controller 40 receives the data of command "0" formed by 1 byte (8 bits), transmits TYPE L (1 byte), TYPE H (1 byte) and the status. TYPE L and TYPE H are data representing that an equipment connected to the joyport connector 46 has what kind of functions, and being the data recorded in the expansion device 50. Therefore, it is possible for the image processor 10 to recognize that what kind of the expansion device 50 is connected to the controller 40. The status is data representing whether or not the expansion device 50 is connected to the joyport and whether or not the expansion device 50 is connected after reset.

Figure 23:
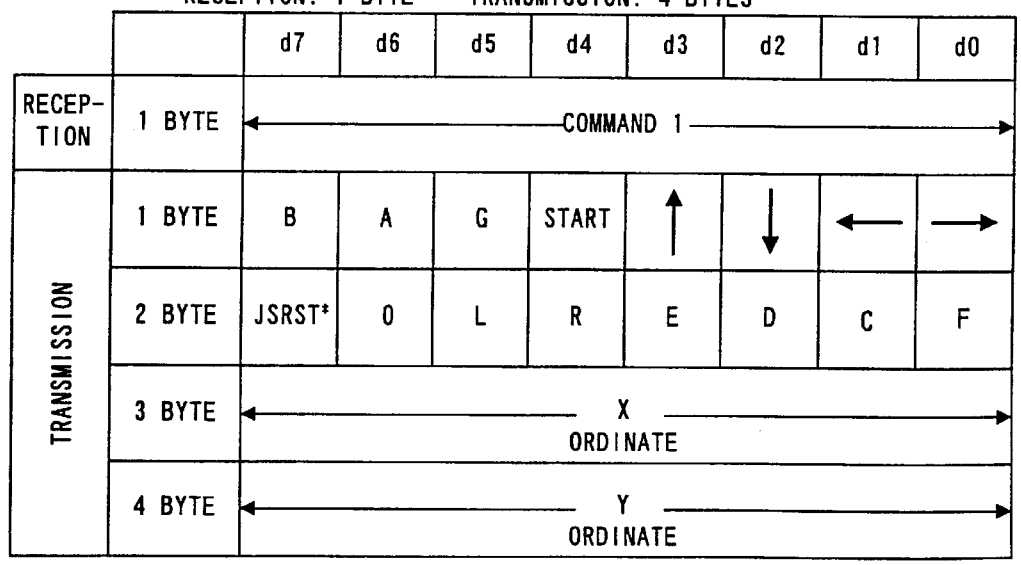
FIG. 23 is an illustrative view showing transmission/reception data of the control circuit at a time that command "1" is transmitted from the controller control circuit.

In the step S408, it is determined whether or not the command as inputted is a pad data request command (command "1"). If not command "1", the process proceeds to a step S412. If command "1", the process proceeds to a step S410 wherein a pad data transmission processing is performed. A specific operation will be described with referring to FIG. 23 which shows in detail transmission/reception data between the image processor 10 and the controller 40 in a case where the CPU 11 outputs command "1".

If the control circuit 442 of the controller 40 receives data of command "1" formed by 1 byte (8 bit), fourteen (14) switch data (16 bits) of B, A, G, START, upper, lower, left, right, L, R, E, D, C and F, and JSRST (1 bit) and data of the counters 444X and 444Y (16 bits). By transmitting such data to the image processor 10, it is possible to make the image processor 10 recognize the controller 40 is operated by the operator in what way.

Figure 24:
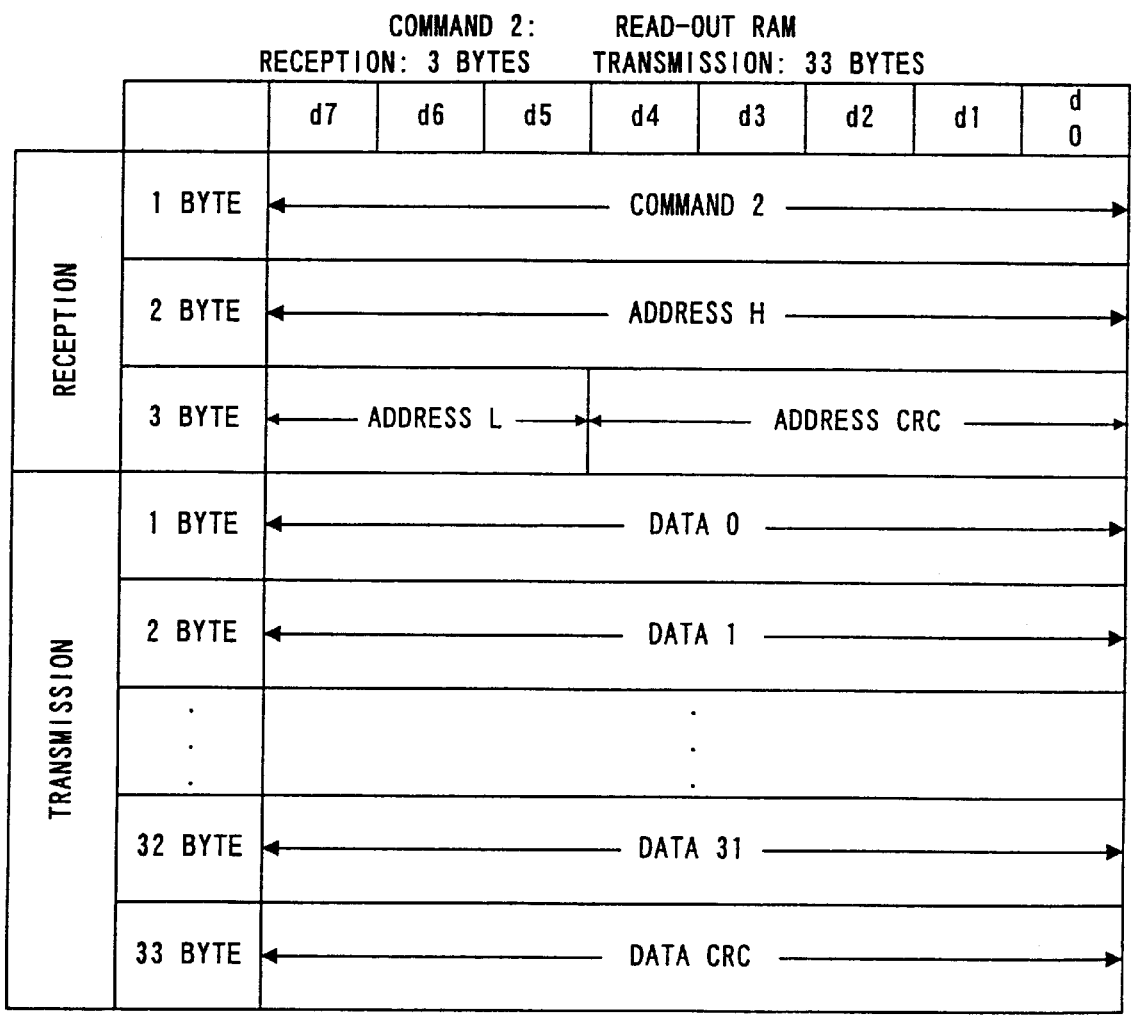
FIG. 24 is an illustrative view showing transmission/reception data of the control circuit at a time that command "2" is transmitted from the controller control circuit.

In the step S412, it is determined whether or not the command as inputted is an expansion connector write request command (command "2"). If not command "2", the process proceeds to the step S416. If command "2", the process proceeds to a step S414 wherein an expansion connector write processing is performed. A specific operation will be described with referring to FIG. 24 which shows in detail transmission/reception data between the image processor 10 and the controller 40 in a case where the CPU 11 outputs command "2".

If the control circuit 442 of the controller 40 receives data of command "2" of 1 byte (8 bits), address H representing upper bits of the address (8 bits), address L representing lower bits of the address (3 bits) and address CRC (5 bits) for checking an address data error of transmission/reception, on the basis of the address data as received, transmits data stored in the expansion device 50 (32 bytes) and CRC (8 bits) for checking a data error. Thus, the expansion device 50 and the image processor 10 are connected to each other, it is possible for the image processor 10 to process the data from the expansion device 50.

Figure 25:
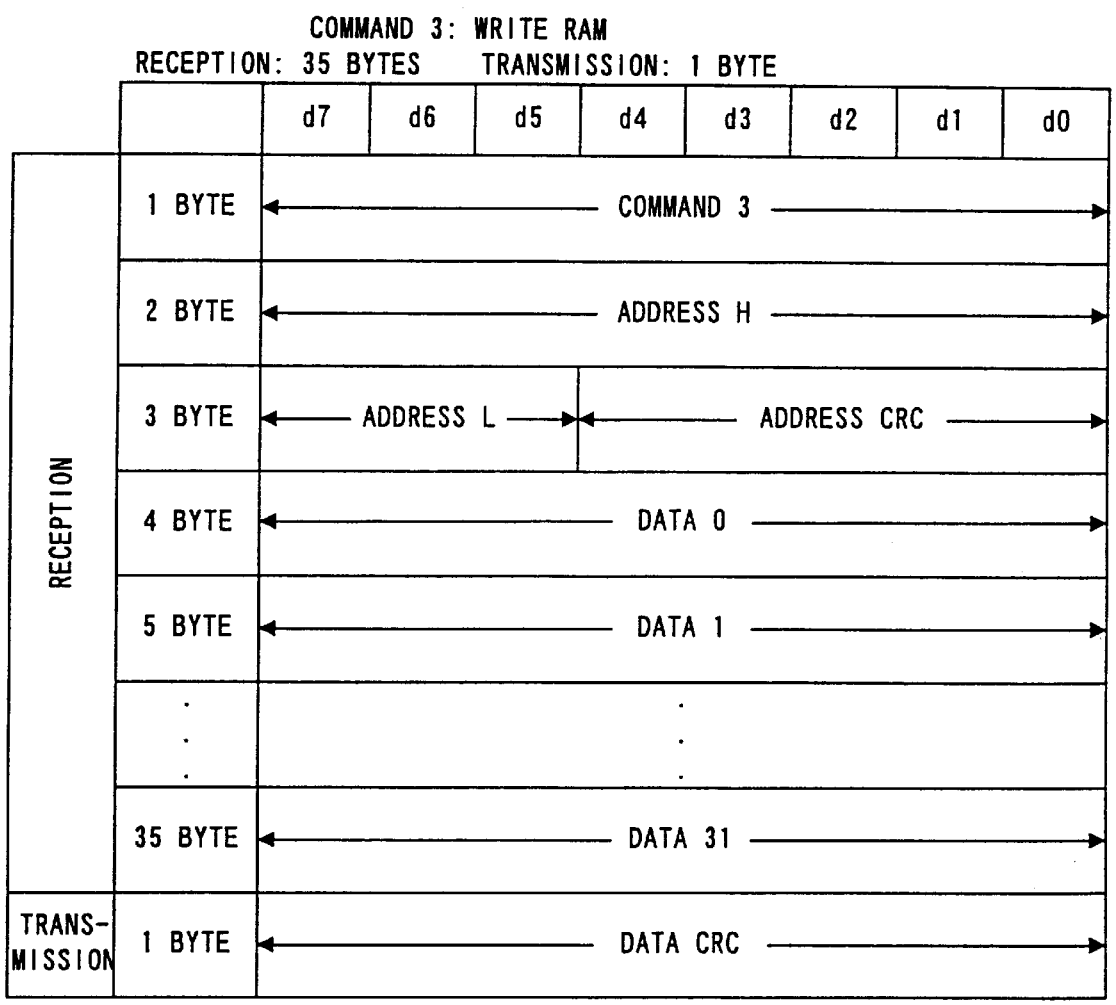
FIG. 25 is an illustrative view showing transmission/reception data of the control circuit at a time that command "3" is transmitted from the controller control circuit.

In the step S416, it is determined whether or not the command as inputted is an expansion connector read request command (command "3"). If not command "3", the process proceeds to a step S420, and if command "3", the process proceeds to a step S418 wherein an expansion connector read processing is performed. A specific operation will be described with referring to FIG. 25 which shows in detail transmission/reception data between the image processor 10 and the controller 40 in a case where the CPU 11 outputs command "3".

If the control circuit 442 of the controller 40 receives data of command "3" formed by 1 byte (8 bits), address H (8 bits) indicative of upper bit of the address, address L (3 bits) indicative of lower bit of the address, address CRC (5 bits) for checking an address data error of transmission/reception and data (32 bytes) to be sent to the expansion device 50, the control circuit 442 transmits CRC (8 bits) for checking an error of the data as received. Thus, the expansion device 50 and the image processor 10 are connected to each other, it becomes possible for the image processor 10 to control the expansion device 50. Furthermore, by connecting the expansion device 50 and the image processor 10, it is possible to drastically increase the function of the controller 40.

Figure 26:
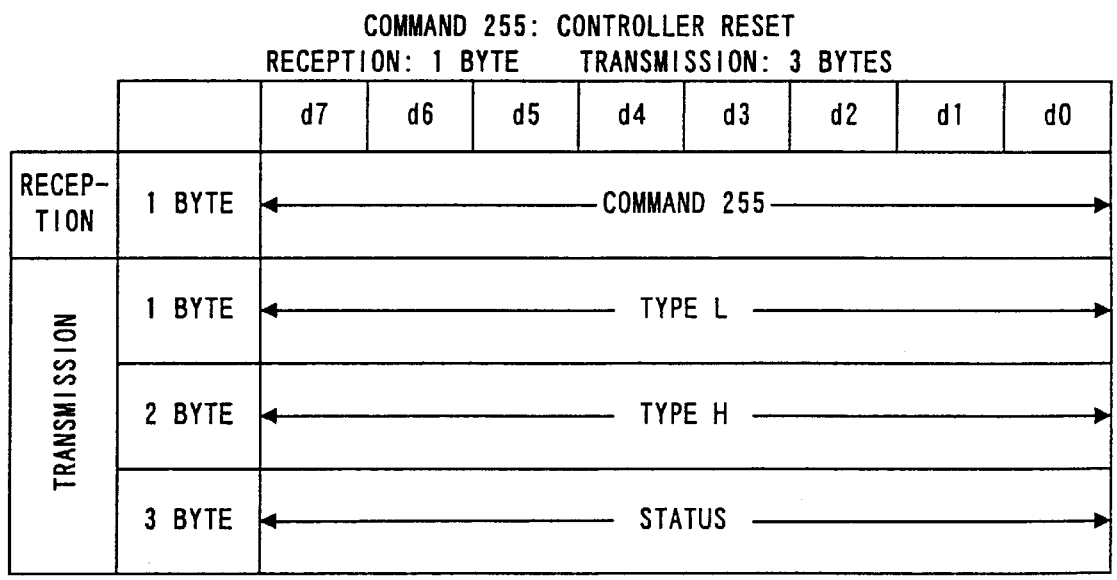
FIG. 26 is an illustrative view showing transmission/reception data of the control circuit at a time that command "255" is transmitted from the controller control circuit.

In the step S420, it is determined whether or not the command as inputted is a reset command (command "255"). If not command "255", the process proceeds to a step S402, and if command "255", the process proceeds to a step S422 in which a joystick counter reset processing is performed. A specific operation will be described with referring to FIG. 26 which shows in detail transmission/reception data between the image processor 10 and the controller 40 at a time that the CPU 11 outputs command "255".

If the control circuit 442 of the controller 40 receives data of command "255" constructed by 1 byte (8 bits), outputs a reset signal to reset the X counter 444X and the Y counter 444Y, and transmits the aforementioned TYPE L (1 byte), TYPE H (1 byte) and the status.

An detailed operation for resetting the joystick 45 will be described.

In order to reset of the joystick 45 to determine an origin point thereof, there are three methods, i.e., a method through an operation of the buttons, a method through turning-on/off the power source, and a method by the image processor 10.

(1) A reset operation by operating the buttons

Figure 27:
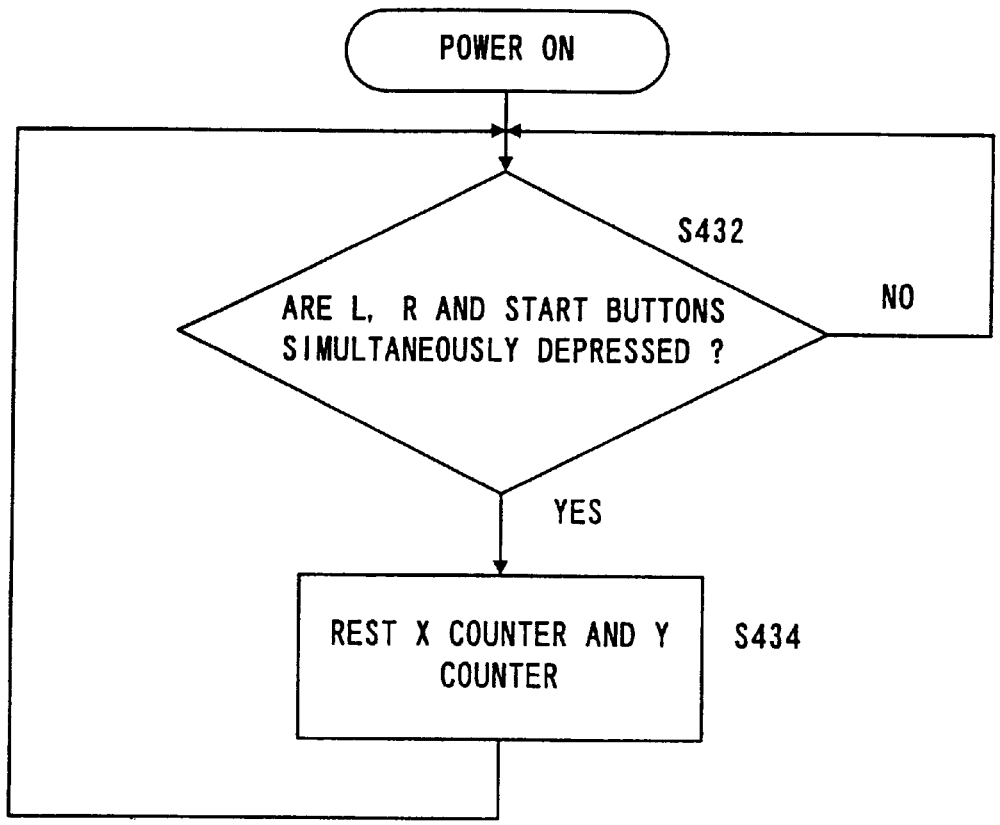
FIG. 27 is a flowchart showing a reset operation of an X counter and a Y counter by an button operation.

With referring to a flowchart shown in FIG. 27, a reset operation of the counter 444 which stores data indicative of an inclined state of the joystick 45. First, in a step S432, the switch signal detection circuit 443 detects whether or not the buttons 406L, 406R and 405 are simultaneously depressed. Then, if the three buttons are not depressed, the detection of the switch signals is performed continuously. Furthermore, if the three buttons are simultaneously depressed, the reset signal is outputted.

In response to the reset signal, in a step S434, the count values of the X counter 444X and the Y counter 444Y are reset. Therefore, the origin point of the joystick is determined at every timing that the buttons 406L, 406R and 405 are simultaneously depressed.

In this embodiment, at a time that the buttons 406L, 406R and 405 are simultaneously depressed by the operator, the reset signal is generated by the switch signal detection circuit 443; however, the number of the buttons is not limited to three (3), and may be two (2) or four (4). Furthermore, buttons simultaneously depressed are not limited to the above described buttons, and may be arbitrary buttons.

(2) A reset operation by turning-on/off the power source.

Figure 28:
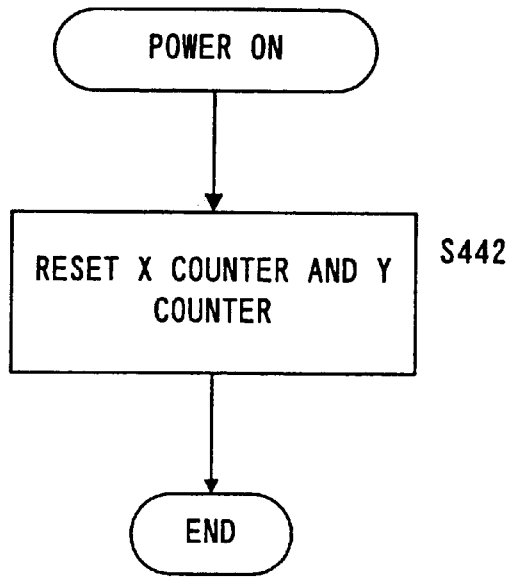

With referring to a flowchart shown in FIG. 28, another reset operation of the counter 444 will be described. A reset signal is outputted from a power-on reset circuit 447 in response to a fact that a power source switch (not shown) of the image processor 10 is turned-on by the operator when the controller 40 is connected to the image processor 10, or in response to a fact that the power source is supplied to the controller 40 by inserting the connection jack of the controller 40 into one of the controller connectors 181–184 of the image processor 10 when no controller 40 is connected to the image processor 10. In response to such a reset signal, in a step S442, the count values of the X counter 444X and the Y counter 444Y are reset. Therefore, the origin point of the joystick is determined at every timing that the power source is supplied to the controller 40.

(3) A reset operation by the image processor 10

The counter 444 is also reset by executing the steps S420 and S422 shown in the above described FIG. 21. Through such a reset operation, it is possible to freely determine the origin point of the joystick 45 by the program in accordance with a processing status of the image processor 10.

According to the above described methods, it is possible to reset the X counter 444X and the Y counter 444Y. If the reset signal is outputted at a time that the lever 474 is in its neutral position, that is, at a time that the lever 474 is not operated by the operator, it is possible to prevent errornous count values from being stored in the X counter 444X and the Y counter 444Y, and therefore, it is possible to prevent the errornous count values from being transmitted to the image processor 10

Figure 29:
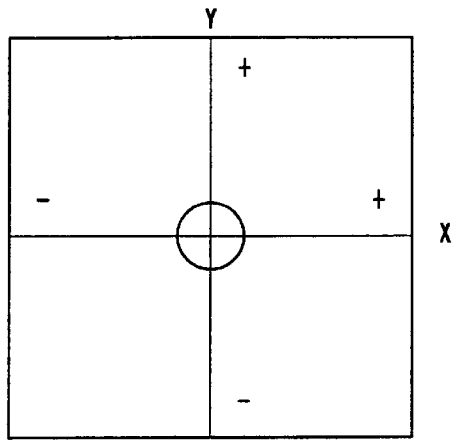
FIG. 29 is an illustrative view showing a relationship between physical coordinates of the lever and a screen of the monitor.
Figure 29:
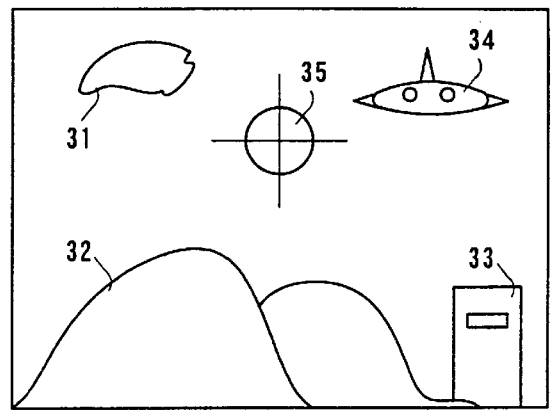

Next, one example that the monitor screen is changed with using the controller 40 will be described with referring to FIG. 29. A left illustration in FIG. 29 shows the physically inclined amount of the lever 474 with using the coordinates. More specifically, a circle illustrated at a center indicates the lever 474, and in this illustration, a state where the operator does not operate the lever 474, that is, a state where the lever 474 stands upright with respect to the housing. If the lever 474 is inclined toward a front side, the circle is moved in a +(positive) direction in the Y axis, and if the lever 474 is inclined toward a rear side, the circle is moved in a –(negative) direction of the Y axis. Furthermore, if the lever 474 is inclined toward a right direction, the circle is moved in a +(positive) direction of the X axis, and if the lever 474 is inclined toward a left side, the circle is moved in a –(negative) direction of the X axis.

A right illustration in FIG. 29 shows a display screen of a game that an enemy 34 is aimed by inclining the lever 474 toward front, rear, left and right so as to move an aiming device 35 toward upper, lower, left and right. Clouds 31, mountains 32 and buildings 33 constitute a background image which can be changed by scrolling and etc., the enemy 34 is an object which can freely move within the screen. For example, when the enemy 34 is displayed in a right upper portion of the screen, if the operator inclines the lever 474 toward right and then front, the X counter 444X and the Y counter 444Y are both incremented, and thus, the count values thereof become larger. The count values are transmitted to the image processor 10 which changes a display position of the aiming device 35 with utilizing the data of the count values. Therefore, the aiming device 35 becomes to be super-positioned on the enemy 34. Then, at a timing the aiming device 35 is just super-positioned on the enemy 34, if the button such as the button 404A is depressed, the switch data of the button is also transmitted to the image processor 10 as similar to the counter data. Accordingly, the image processor 10 generates the image signal so as to display a missile (not shown) or the like which can attack the enemy 34 on the screen.

Figure 30:
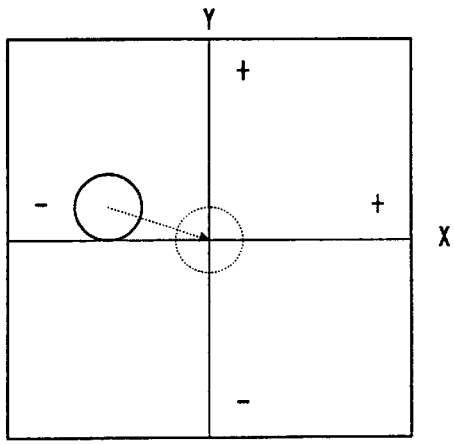
FIG. 30 is an illustrative view showing a relationship between the physical coordinates of the lever and the screen of the monitor at the time that the reset operation is performed at a position other than a center of the lever.
Figure 30:
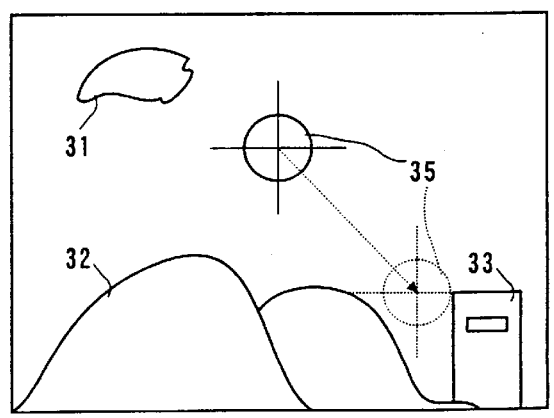

Next, one example of a case where the analog joystick is reset in a state where the lever 474 is deviated from the center, that is, the lever 474 is inclined will be described with referring to FIG. 30. When the X counter 444X and the Y counter 444Y are reset at the coordinate position indicated by a solid circular line in a left illustration in FIG. 30, if the operator releases his or her hand from the lever 474, the lever 474 returns to the center of the coordinate, i.e., a position indicated by a dotted circular line. A change of the image will be described with utilizing a right illustration in FIG. 30. First, when the X counter 444X and the Y counter 444Y are reset, as similar to the right illustration in FIG. 29, the aiming device 35 is displayed at the solid circular line because the count values of the X counter 444X and the Y counter 444Y are both "0" equal to the initial values. Next, if the operator releases his or her hand from the lever 474, the lever 474 returns to the center position of the coordinate, and the X counter 444X within the controller 40 is incremented and the Y counter 444Y is decremented, and therefore, the count values of the counters 444X and 444Y become larger and smaller, respectively. The count values are transmitted to the image processor 10 which changes the display position of the aiming device 35 with utilizing the data of the count values to the position of an aiming device 35 indicated by a dotted line A description will be made on that such a reset operation is performed at what timing. For example, if the operator presumes the position that the enemy 34 appears is the position of the aiming device 35 shown by the dotted line in the right illustration in FIG. 30, the operator wishes to super-positions the aiming device 35 at the position of the dotted line aiming device 35 at an instance that the enemy 34 appears. However, if the aiming device 35 is continuously kept on the dotted line aiming device 35, the operator who is a game player is bored, and there is a further possibility that if the enemy 34 appears at a place not presumed, the operator cannot attack the enemy, and therefore, in order to super-position the aiming device 35 on the position of the dotted line aiming device 35 at an instance that the enemy 34 appears, and to freely move the aiming device 35 to other places, the above described reset function is used. In describing an action of the operator more specifically, the operator first inclines the lever 474 such that the aiming device 35 is displayed at a position symmetrically corresponding to the position presumed that the enemy 34 will appear (the position of the dotted line aiming device 35) with reference to the solid line aiming device 35. At that time, the physical coordinate position of the lever 474 becomes the solid circular line in the left illustration in FIG. 30. Then, the operator simultaneously depresses the three buttons of the buttons 406L, 406R and 405. In response to the depression, the X counter 444X and the Y counter 444Y are both reset, and the aiming device 35 is displayed at the position of the solid line aiming device 35. Then, the operator freely moves the aiming device 35, and waits for an appearance of the enemy 34. In the enemy 34 appears at the position of the dotted line aiming device 35, the operator releases the hand from the lever 474. Therefore, the lever 474 returns to the physical coordinate position shown by the dotted circular line in the left illustration in FIG. 30. Resultingly, the aiming device 35 becomes to be displayed at the dotted line aiming device 35. When the operator surely super-positions the aiming device 35 on the enemy 34, and depresses the switch such as the button 404A, a missile (not shown) or the like which attacks the enemy 34 is displayed on the screen.

Furthermore, if the reset operation is performed in the above described manner, it is possible to largely move the lever 474 toward a right lower direction, and therefore, the above described reset operation is also effective at a time that the operator wishes to largely move the lever 474 toward a right lower direction.

Next, a method that becomes a feature of the present invention and that the data of the analog joystick 45 is corrected will be described. Reasons why the data of the analog joystick is to be corrected are because the deviation of the data in the neutral position of the lever 474 occurs, and because it is necessary to change the inclinable range of the lever 474.

Figure 31:
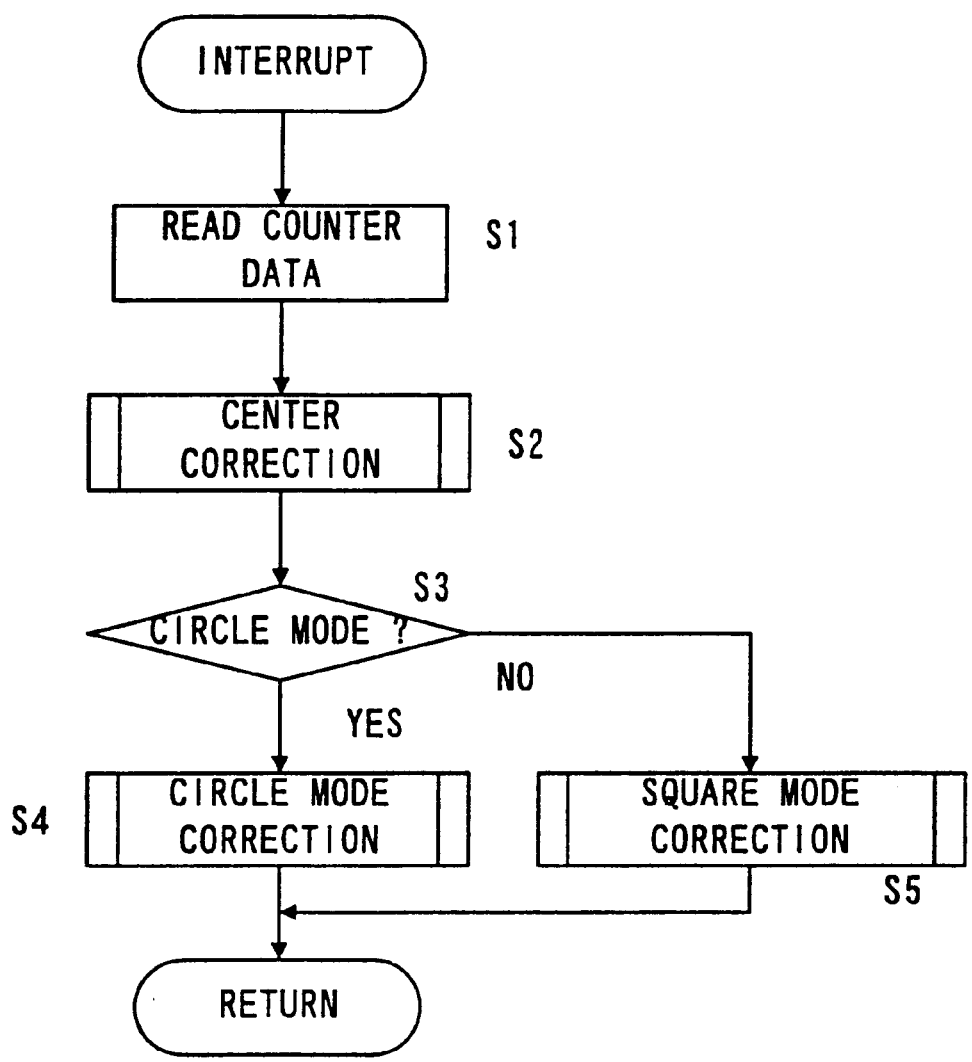
FIG. 31 is a flowchart showing one example of a timer-interrupt routine for correcting data of the analog joystick in FIG. 5 embodiment.

In order to correct the data from the analog joystick 45, a timer-interrupt routine shown in FIG. 31 is executed. The timer-interrupt routine is executed at every constant time period such as 1/30 seconds.

In a first step S1 shown in FIG. 31, the X count value and the Y count value, i.e. the coordinates data Xa and Ya indicative of an actually inclined direction and an actually inclined amount of the lever 474 are read from the X counter 444X and the Y counter 444Y. The data Xa and Ya are stored in a memory (not shown) included in the control circuit 442. In a succeeding step S2, a center correction is executed. A term "center correction" means a correction operation that the deviations of the data Xa and Ya from "0" at the neutral position of the lever 474 of the analog joystick 45 are corrected. More specifically, if the operation of the lever 474 is released by the operator, the lever 474 returns to its neutral position, and this time, the data Xa and Ya become to have "0". However, due to a friction exists in an internal mechanism of the analog joystick 45, there is an occasion that the data Xa and Ya of the X counter 444X and Y counter 444Y do not return to "0" at the neutral position of the lever 474. As described later in detail, as the method for the center correction, there are three methods shown in FIG. 32, FIG. 34 and FIG. 36.

Figure 38:
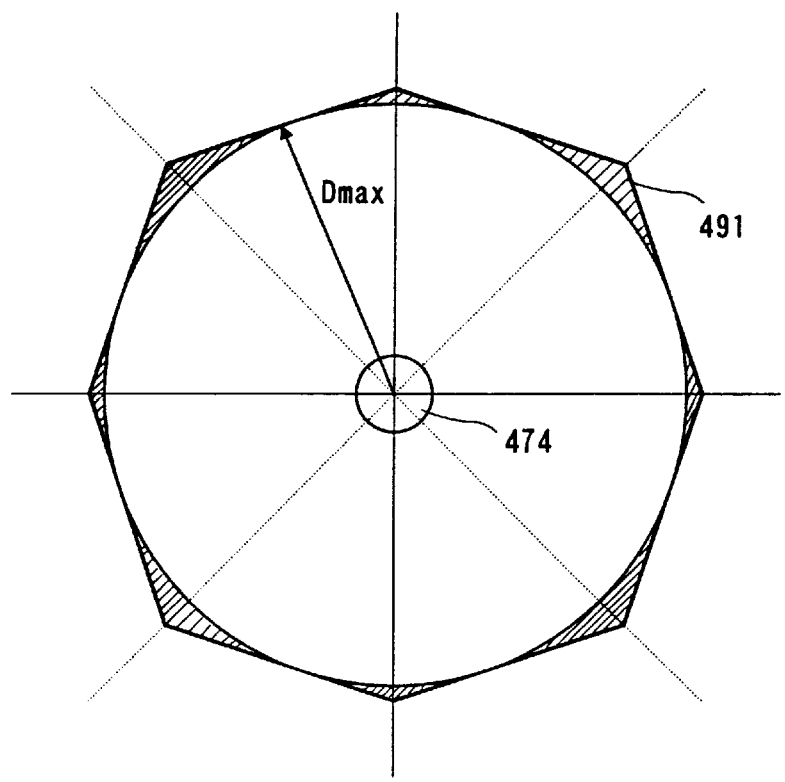
FIG. 38 is an illustrative view showing a method for a periphery correction.

If the center correction in the step S2 is completed, in a next step S3, it is determined whether or not a periphery correction mode set at the time is "circle mode". In the above described embodiment, the guide ring 486 of the analog joystick 45 has the octagonal outer edge 491, and therefore, the lever 474 can be inclined within such an octagonal range due to the outer edge 491 of the guide ring 486. However, according to the game content, it is required to regard that the lever is inclined within a circular or rectangular range not the octagonal range. A case where the substantially inclinable range of the lever 474 is a circle as shown in FIG. 38 is called as "circle mode", and a case where the substantially inclinable range of the lever is a square is called as "square mode". In a case of the former, although the lever 474 is actually inclined within the octagonal range due to a restriction by the octagonal outer edge 491, in a step S4, a movement of the lever 474 is corrected into a circle range shown in FIG. 38. In a case of the latter, in a step S5, the movement of the lever 474 is corrected into a square range shown in FIG. 40. "Circle mode" is preferably applied to a game that it is desirable that the joystick data is not changed according to the inclined direction of the lever 474, a game that the movable character is moved in all the directions on the monitor screen in response to the direction and amount that the lever is inclined, for example. "Square mode" is preferably applied to a game that the lever 474 is inclined toward left or right at a state where the lever 474 is inclined toward front or rear at its maximum inclination position, such as the aforementioned racing game.

Figure 32:
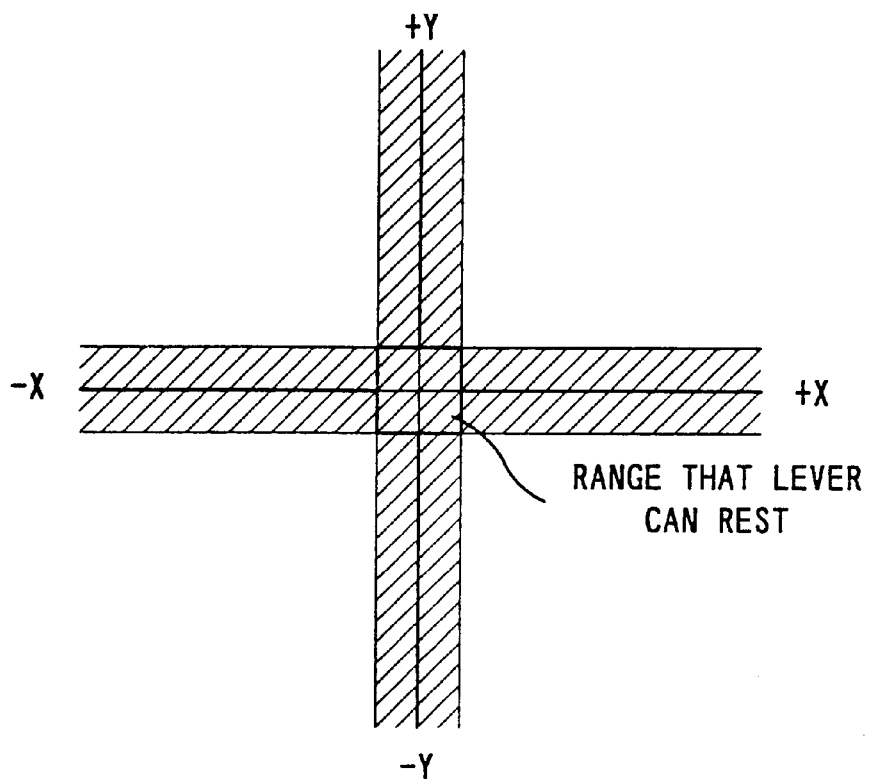

With referring to FIG. 32 and FIG. 33, a first center correction method will be described. A method shown in FIG. 32 is a method that when the data Xa and Ya of the X counter 444X and the Y counter 444Y respectively exist within a predetermined range defined by oblique lines in FIG. 32, data outputted from the analog joystick 45 (hereinafter called as "joystick data") X and Y are regarded as "0", respectively. Specifically, if the counter data Xa exists in a range from "+16" to "-16", the joystick data X is outputted as "0". Similarly, if the counter data Ya exists in a range from "+16" to "-16", the joystick data Y of "0" is outputted. In addition, these specific numeral values "16" and "-16" are values determined through a laboratory work by the inventors et al.; however, it is needless to say that other arbitrary numeral values may be set. That is, in the laboratory work by the inventors et al., the deviation of the data at the neutral position of the lever 474 is approximately within the range from "16" to "-16", and therefore, the above described numeral values are utilized; however, if it is considered that other numeral values are preferable, the other numeral values may be used.

Figure 33:
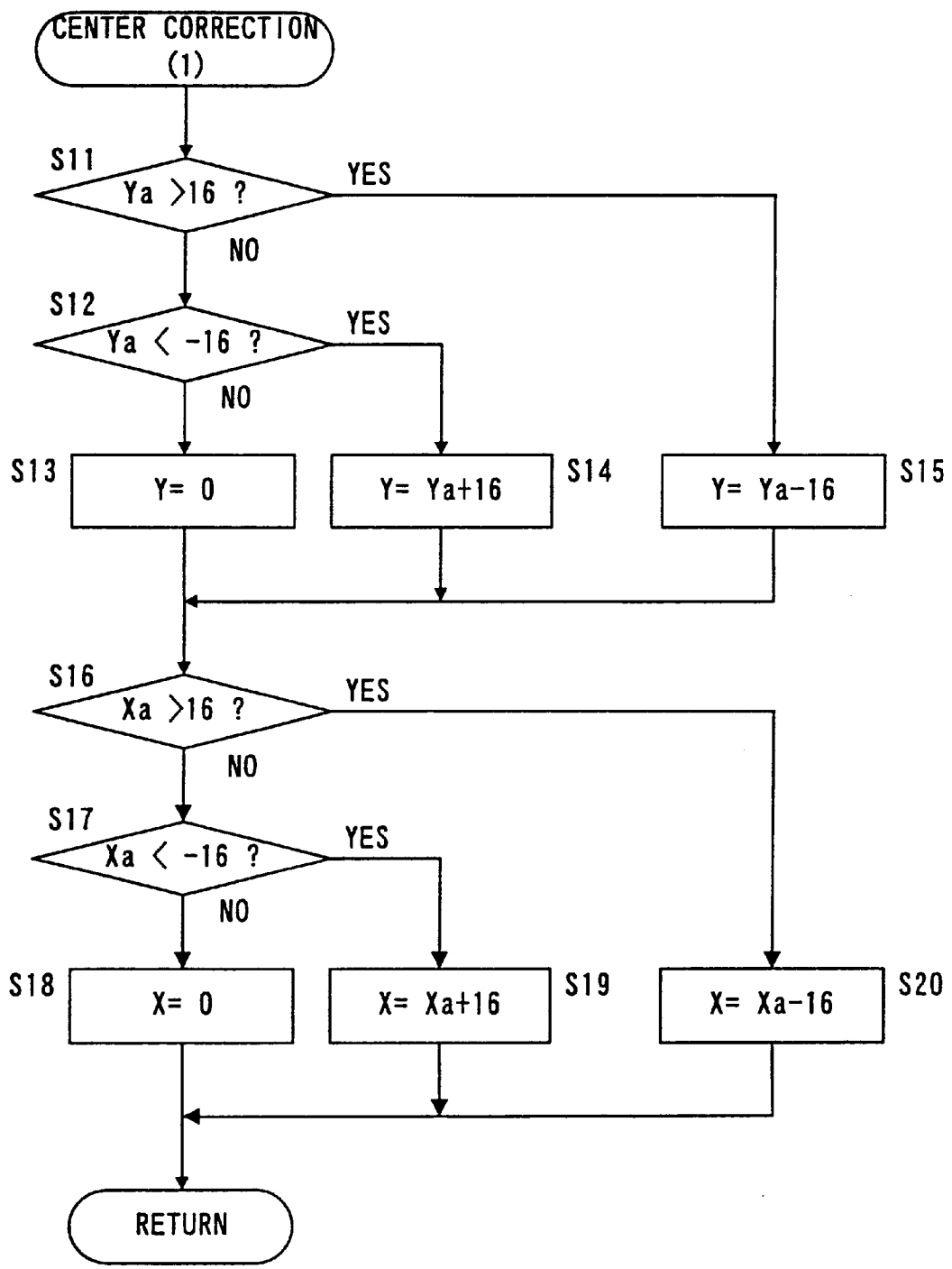
FIG. 33 is an illustrative view showing a method of a center correction.

In a first step S11 shown in FIG. 33, it is determined whether or not the counter data Ya is larger than "16" (Ya>16). If "YES" is determined in the step S11, that is, if the counter data Ya is larger than "16", in a next step S12, a value obtained by subtracting "16" from the counter data Ya (Ya−16) is set as the joystick data Y.

If "NO" is determined in the step S11, in a step S13, it is determined whether or not the counter data Ya is smaller than "-16". If "YES" is determined in the step S13, that is, if the counter data Ya is smaller than "-16", in a next step S14, as the joystick data Y, a value obtained by adding "16" to the counter data Ya (Ya+16) is set.

If "NO" is determined in the step S13, that is, if it is determined that the counter data Ya is in the range from "16" to "-16", in a step S15, as the joystick data Y, "0" is outputted (Y=0).

After the step S12, S14 or S15, in a step S16, it is determined whether or not the counter data Xa is larger than "16" (Xa>16). If "YES" is determined in the step S16, that is, if the counter data Xa is larger than "16", in a next step S17, a value obtained by subtracting "16" from the counter data Xa (Xa−16) is set as the joystick data X.

If "NO" is determined in the step S16, in a step S18, it is determined whether or not the counter data Xa is smaller than "-16". If "YES" is determined in the step S18, that is, if the counter data Xa is smaller than "-16", in a next step S19, as the joystick data X, a value obtained by adding "16" to the counter data Xa (Xa+16) is set.

If "NO" is determined in the step S18, that is, if it is determined that the counter data Xa is in the range from "16" to "-16", in a step S20, as the joystick data X, "0" is outputted (X=0). Then, the process returns to FIG. 31.

According to the first method, the joystick data Xa and Ya both become "0" at the neutral position of the lever 474, and therefore, the data deviation at the neutral position can be solved. However, the vicinity of the X axis and the Y axis, that is, a range of oblique lines in FIG. 32 becomes a dead area wherein in spite of the movement of the lever 474, the joystick data of "0" is outputted, and therefore, a so called "play" occurs. Therefore, the first method is preferably applied to a game in which "play" of the analog joystick can be allowed.

Figure 34:
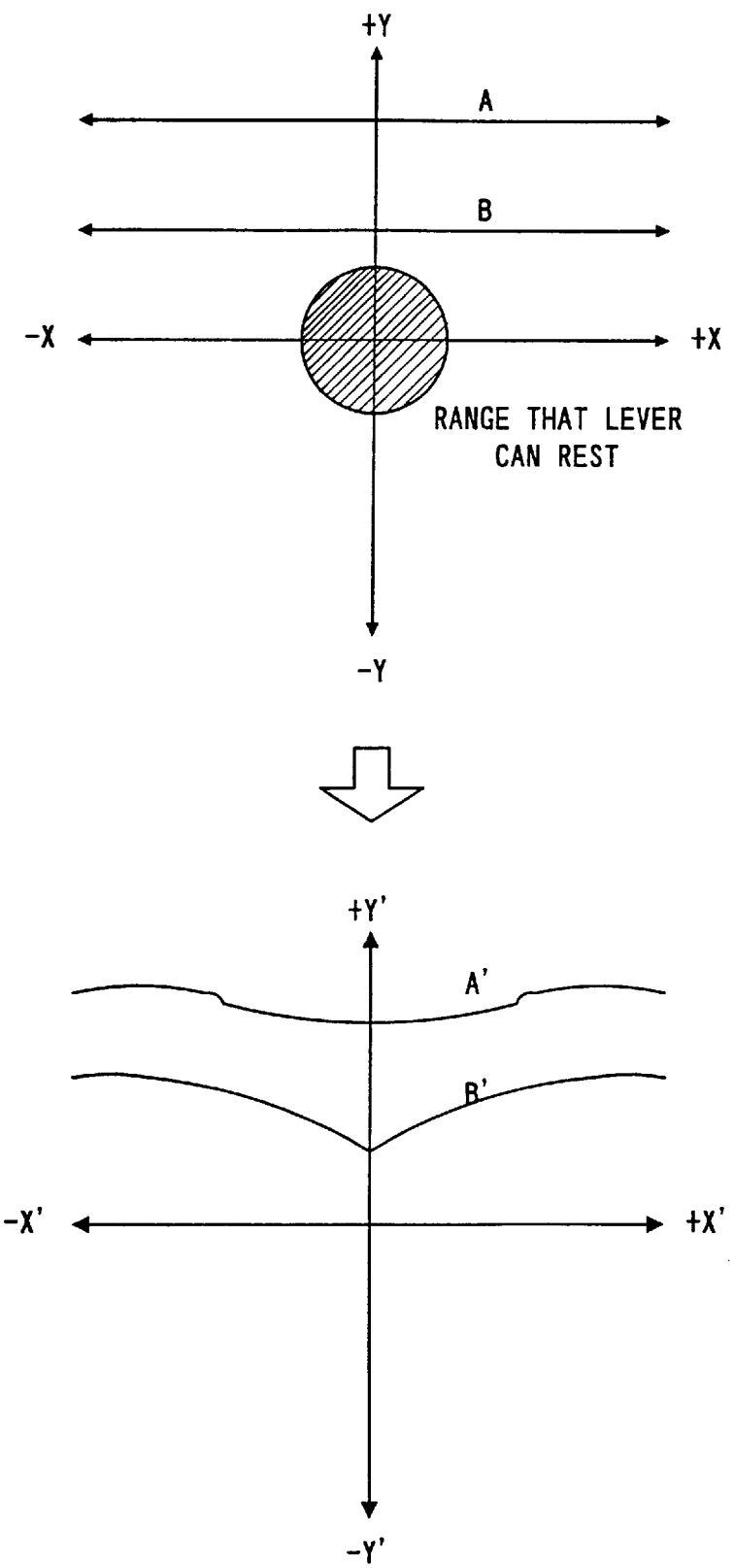
FIG. 34 is an illustrative view showing another method of the center correction.
Figure 35:
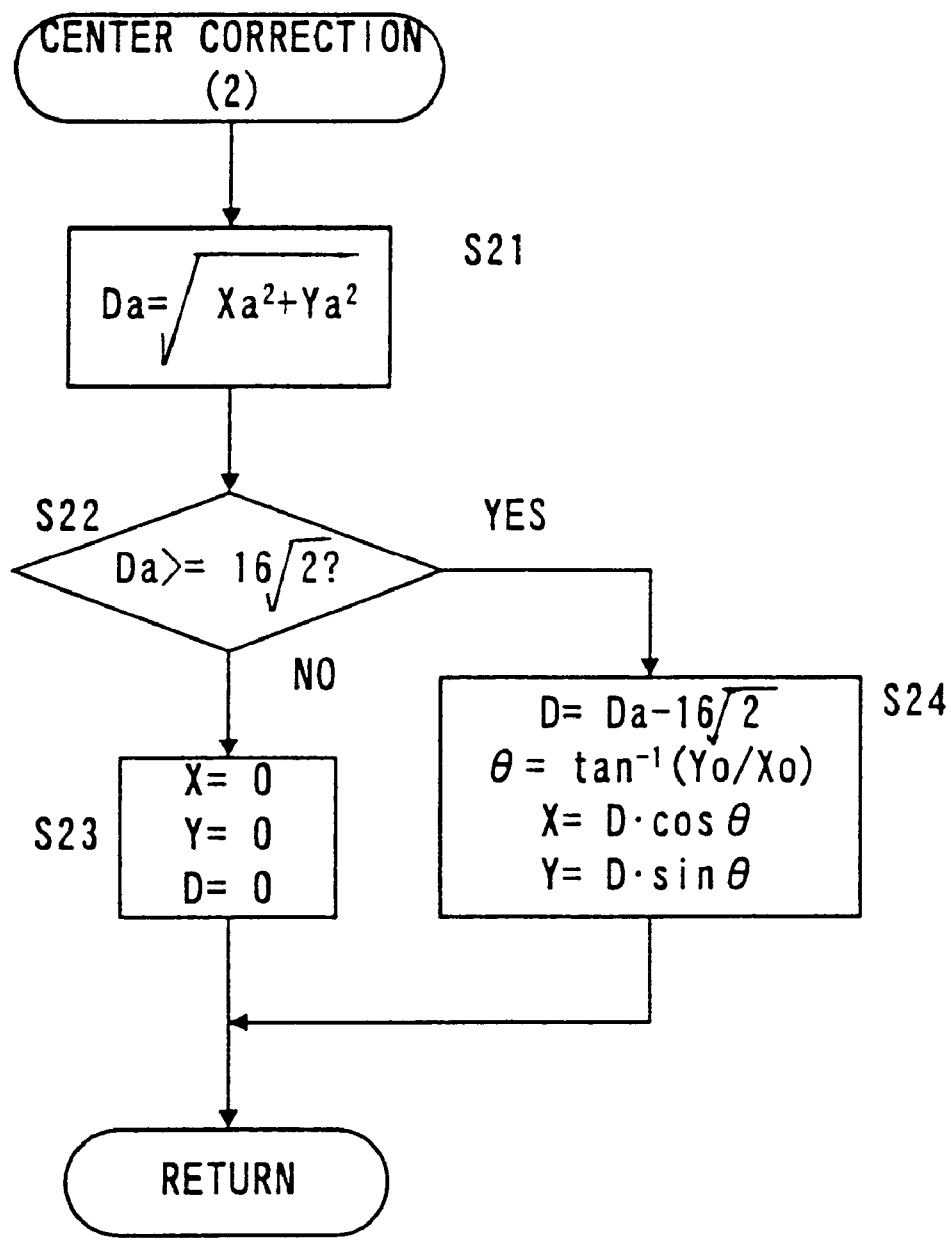
FIG. 35 is a flowchart showing the method.

In a second method for the center correction shown in FIG. 34 and FIG. 35, the data is shifted in a manner that a circular portion shown in FIG. 34 is super-positioned to a center (0, 0). More specifically, the counter data within a range other than a range shown by oblique lines in FIG. 34 is shifted toward the center by 16√2. In this method, as is different from the first method, no "play" occurs; however, it is necessary to perform calculations of trigonometric functions and roots. More specifically, in a step S21 shown in FIG. 35, an inclined amount Da of the lever 474 is calculated according to the following equation (1).

$$Da = \sqrt{Xa^2 + Ya^2} \quad (1)$$

Then, in a next step S22, it is determined whether or not the inclined amount Da is equal to or larger than a predetermined value (16√2). That is, in the step S22, it is determined whether or not the inclined amount Da of the lever 474 is within the range of the circle shown in FIG. 34. If "NO" is determined in the step S22, in a step S23, joystick data of "0" are outputted, that is, X=0, Y=0 and D=0 are set.

However, if "YES" is determined in the step S22, the joystick data is calculated according to the following equations (2).

$$D=Da-16\sqrt{12}$$
$$\theta=\tan^{-1}(Ya/Xa)$$
$$X=D\cdot\cos\theta$$
$$Y=D\cdot\sin\theta \quad (2)$$

Thus, according to the second method, a straight motion shown by A and B in FIG. 34 is converted into a curved motion shown by A' and B'.

Figure 36:
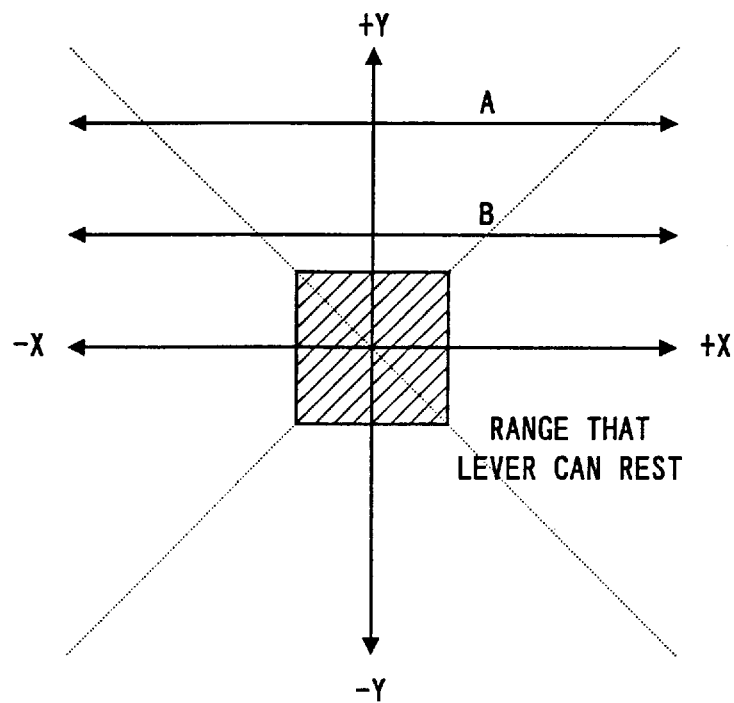
FIG. 36 is an illustrative view showing a further method of the center correction.
Figure 36:
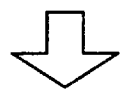
Figure 36:
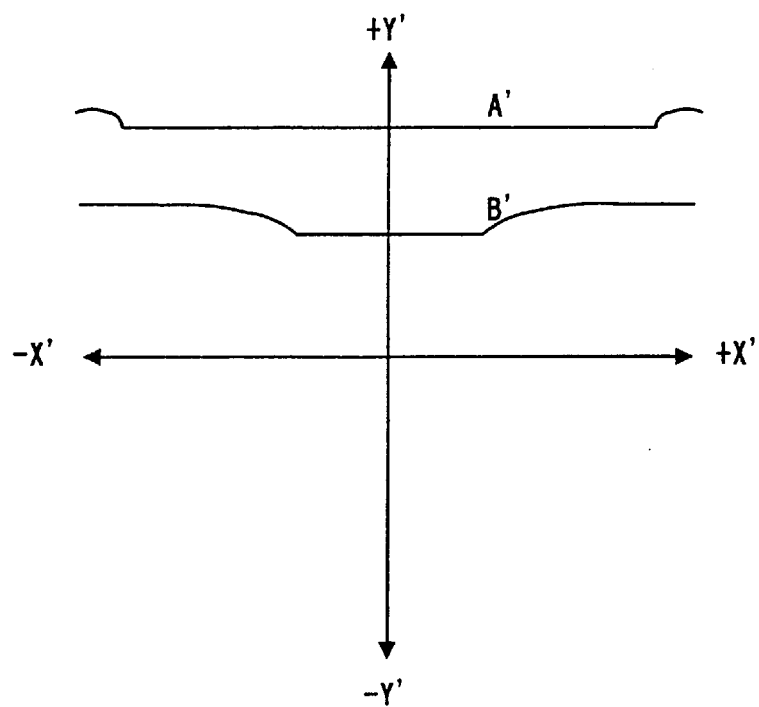

In a third center correction method, the counter data are converted in a manner that a square range shown in FIG. 36, that is, a range that the lever 474 can rest becomes to be super-positioned on a center (0,0). In the third method, no "play" occurs and it is unnecessary to perform complex calculations.

Figure 37:
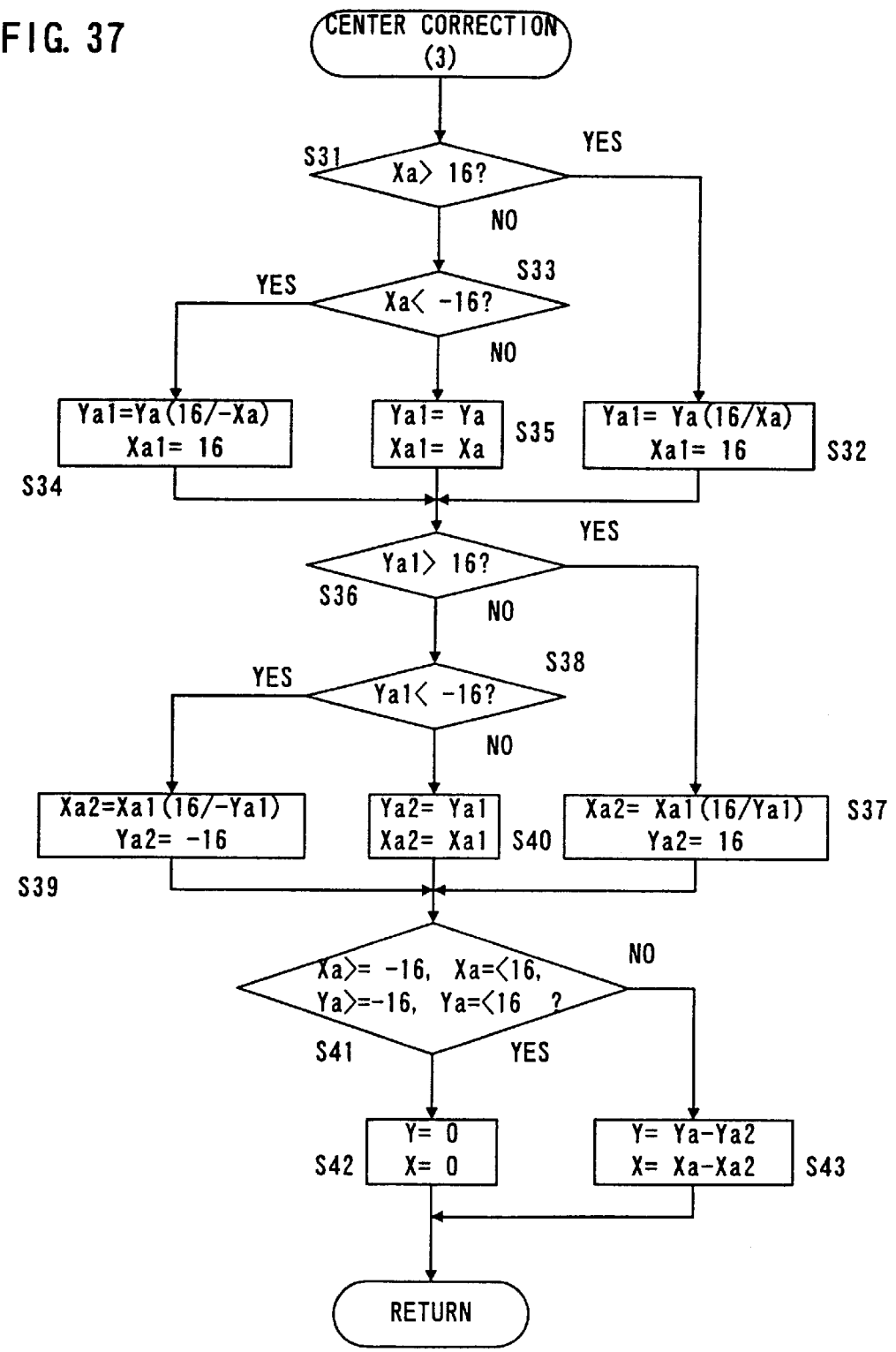
FIG. 37 is a flowchart showing the method.

In a first step S31 in FIG. 37, it is determined whether or not the counter data Xa is larger than a predetermined value ("16", for example). If "YES" is determined in the step S31, in a next step S32, intermediate values Ya1 and Xa1 are calculated according to the following equations (3).

$$Ya1=Ya(16/Xa)$$
$$Xa1=16 \quad (3)$$

Furthermore, if "NO" is determined in the step S31, in a step S33, it is determined whether or not the counter data Xa is smaller that a predetermined value ("-16", for example). If "YES" is determined in the step S33, in a next step S34, intermediate values Ya1 and Xa1 are calculated according to the following equations (4).

$$Ya1=Ya(16/-Xa)$$
$$Xa1=-16 \quad (4)$$

In addition, if "NO" is determined in each of the steps S31 and S33, the counter data themselves are outputted as the intermediate values.

In a succeeding step S36, it is determined whether or not the intermediate value Ya1 is larger than a predetermined value ("16", for example). If "YES" is determined in the step S36, in a next step S37, intermediate values Ya2 and Xa2 are calculated according to the following equations (5).

$$Xa2 = Xa1(16/Ya1)$$

$$Ya2 = 16 \qquad (5)$$

Furthermore, if "NO" is determined in the step S36, in a step S38, it is determined whether or not the intermediate value Ya1 is smaller that a predetermined value ("−16", for example). If "YES" is determined in the step S38, in a next step S39, intermediate values Ya2 and Xa2 are calculated according to the following equations (6).

$$Xa2 = Xa1(16/Ya1)$$

$$Ya2 = -16 \qquad (6)$$

In addition, if "NO" is determined in each of the steps S36 and S38, the intermediate values Ya1 and Xa1 themselves are outputted as the intermediate values Ya2 and Xa2.

Thereafter, a step S41 is executed to determine whether or not four conditions can be simultaneously satisfied. A first condition is that the counter data Xa is equal to or larger than "−16" (Xa≧−16). A second condition is that the counter data Xa is equal to or smaller than "16" (Xa≦16). A third condition is that the counter data Ya is equal to or larger than "−16" (Ya≧−16), and a fourth condition is that the counter data Ya is equal to or smaller than "16" (Ya≦16). If all the four conditions are satisfied, in the step S41, "YES" is determined. In such a case, as the joystick data Y and X, "0" are outputted, respectively (Y=0, X=0). If "NO" is determined in the step S41, the joystick data Y and X are calculated according to the following equations (7).

$$Y = Ya - Ya2$$

$$X = Xa - Xa2 \qquad (7)$$

After the center correction is thus performed according to any one of the three methods, steps after the step S3 in FIG. 31 are executed.

With referring to FIG. 38 and FIG. 39, a step S4 in FIG. 31, i.e., "circle mode" will be described. In the "circle mode", the physically inclinable range of the lever 474 is corrected to a circular shape. However, it is to be noted that data used in such the periphery correction are the data subjected to the center correction in advance, that is, the joystick data. In a method shown in FIG. 38, a range equal to a difference between the octagonal shape and the circular shape, that is, a portion indicated by oblique lines in FIG. 38 becomes "play" of the lever 474.

Figure 39:
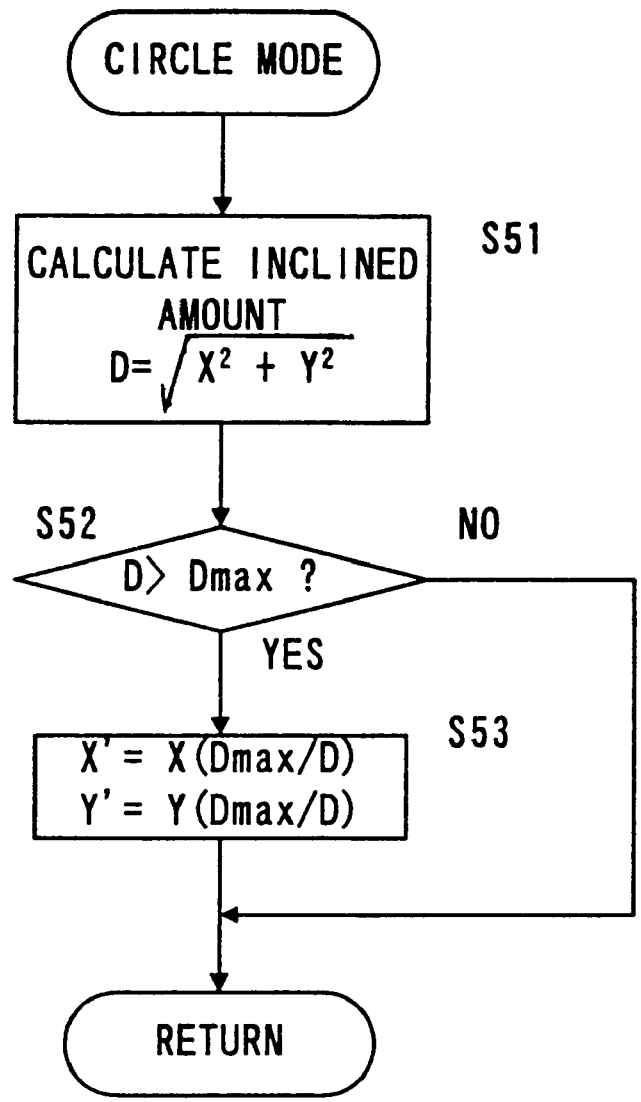
FIG. 39 is a flowchart showing the method.

More specifically, in a first step S51 in FIG. 39, as similar to the step S21 and the equation (1), an inclined amount D is calculated on the basis of the joystick data X and Y. Next, in a step S52, it is determined whether or not the inclined amount D is larger than its maximum value Dmax (D>Dmax). The maximum value Dmax of the inclined amount D is an inherent value for the analog joystick 45, and stored in advance in a memory (not shown). Therefore, in the step S52, the inclined amount D and the maximum value Dmax are compared with each other. If "NO" is determined in the step S52, it means that the lever 474 is not inclined up to a position that the lever 474 is brought into contact with the guide ring 486 (FIG. 15), and in such a case, the joystick data which have been subjected to the center correction themselves are outputted.

In contrast, if the lever 474 is inclined up to the position that the lever 474 is brought into contact with the guide ring 486, that is, if "YES" is determined in the step S52, joystick data X' and Y' are calculated according to the following equations (8).

$$X' = X(Dmax/D)$$

$$Y' = Y(Dmax/D) \qquad (8)$$

Thus, the physically inclinable range being the octagonal shape can be converted or corrected into the substantially inclinable range being the circular shape.

Figure 40:
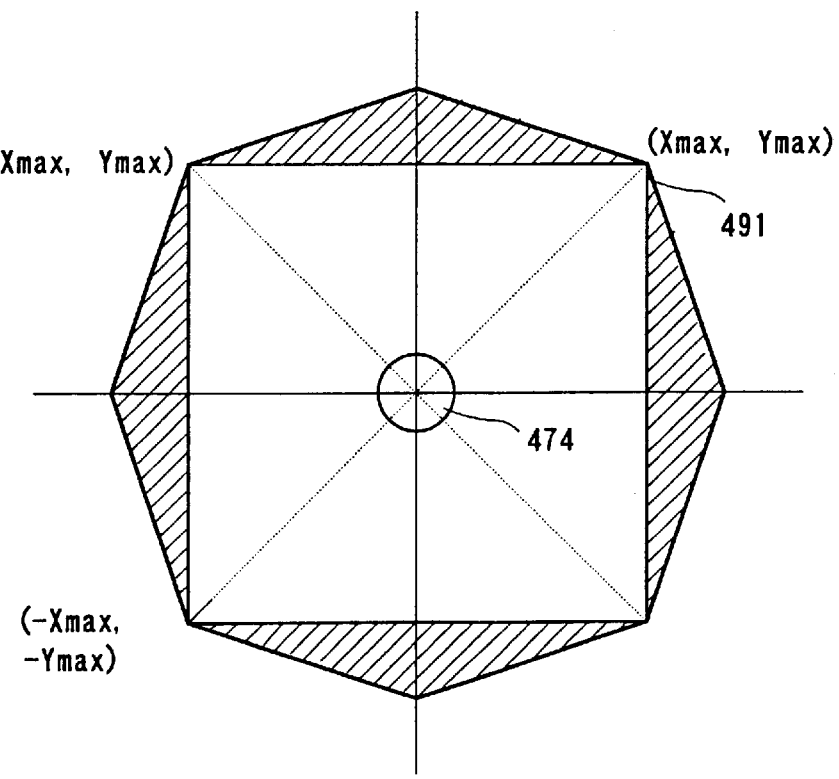
FIG. 40 is an illustrative view showing another method of the periphery correction.

With referring to FIG. 40 and FIG. 41, "square mode" in a step S5 in FIG. 31 will be described. In the "square mode", the physically inclinable range of the lever 474 is corrected to a square shape shown in FIG. 40. In a method shown in FIG. 40, a range equal to a difference between the octagonal shape and the square shape, that is, a portion indicated by oblique lines in FIG. 40 becomes "play" of the lever 474.

Figure 41:
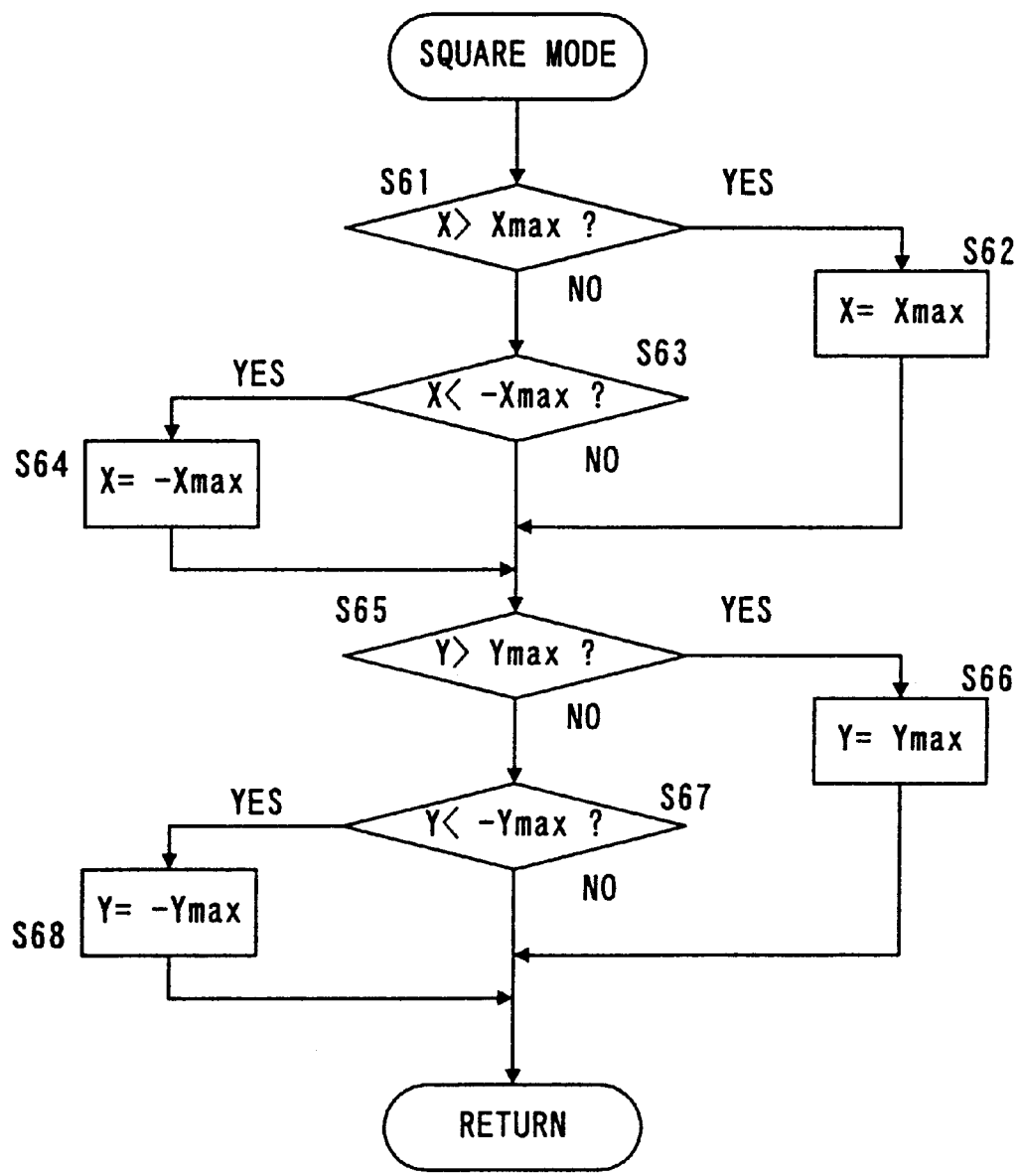
FIG. 41 is a flowchart showing the method.

In a first step S61 in FIG. 41, it is determined whether or not the joystick data X is larger than its maximum value Xmax. As similar to a positive maximum value of the Y axis (described later), the positive maximum value Xmax of the X axis is an inherent value for the analog joystick 45, and stored in advance in a memory (not shown). Therefore, in the step S61, the joystick data X and the maximum value Xmax are compared with each other. If "YES" is determined in the step S61, in a step S 62, the positive maximum value Xmax is outputted as the joystick data X.

If "NO" is determined in the step S61, in a step S63, it is further determined whether or not the joystick data X is smaller than its negative maximum value −Xmax. The negative maximum value −Xmax of the X axis is also an inherent value for the analog joystick 45, and stored in advance in a memory (not shown). Therefore, in the step S63, the joystick data X and the negative maximum value −Xmax are compared with each other. If "YES" is determined in the step S63, in a step S 62, the negative maximum value −Xmax is outputted as the joystick data X.

As to the Y axis, a similar processing is performed. More specifically, in a step S65, it is determined whether or not the joystick data Y is larger than its maximum value Ymax. The positive maximum value Ymax of the Y axis is also an inherent value for the analog joystick 45, and stored in advance in a memory (not shown). Therefore, in the step S65, the joystick data Y and the positive maximum value Ymax are compared with each other. If "YES" is determined in the step S65, in a step S66, the positive maximum value Ymax is outputted as the joystick data Y.

If "NO" is determined in the step S65, in a step S67, it is further determined whether or not the joystick data Y is smaller than its negative maximum value −Ymax. The negative maximum value −Ymax of the Y axis is also an inherent value for the analog joystick 45, and stored in advance in a memory (not shown). Therefore, in the step S67, the joystick data Y and the negative maximum value −Ymax are compared with each other. If "YES" is determined in the step S67, in a step S68, the negative maximum value −Ymax is outputted as the joystick data Y.

Thus, in the above described embodiment, by setting the dead area in a portion (central portion and/or peripheral portion) of the inclinable range of the lever 474, not only the data deviation at the neutral position of the lever 474 can be solved but also it is possible to arbitrarily set the substantially inclinable range of the lever 474 spite the shape of the guide ring 486. Therefore, it is possible to set a shape of the substantially inclinable range of the lever 474 being preferably applied to a specific game.

Although the present invention has been described and illustrated in detail, it is clearly understood that the same is by way of illustration and example only and is not to be taken by way of limitation, the spirit and scope of the present invention being limited only by the terms of the appended claims.

We claim:

1. An image processing system which comprises an image processor which generates image data of an image to be displayed on a monitor, and an analog joystick, comprising:

a joystick lever which is inclined within an inclinable range when said lever is operated by an operator and rests at a predetermined state indicative of a center of a coordinate reference frame if said lever is not operated by the operator;

inclined amount data output circuitry which outputs inclined amount data according to an inclined amount of said lever; and an image processor being operable to determine on the basis of said inclined amount data whether or not said lever exists within a dead area of said coordinate reference frame including the center;

said image processor being operable to perform a first correction operation to correct said inclined amount data to center data indicative of said center when it is determined that said lever exists within said dead area;

said image processor being operable to perform a second correction operation to correct said inclined amount data on the basis of an inclined amount equal to a distance from said center to said dead area when it determines that said lever exists outside said dead area; and said image processor being operable to output image data on the basis of inclined amount data which is corrected by said first correction operation when said lever exists within said dead area, or on the basis of inclined amount data which is corrected by said second correction operation when said lever exists outside said dead area.

2. An image processing system according to claim 1, wherein said second correction operation includes a calculation which corrects said inclined amount data on the basis of a predetermined calculation equation.

3. An image processing system according to claim 2, wherein said image processor is operable to output X direction inclined amount data indicative of an inclination of said lever in an X direction, and a Y direction inclined amount data indicative of an inclination of said lever in a Y direction.

4. An image processing system according to claim 3, wherein said calculation includes subtracting predetermined values from said X direction inclined amount and said Y direction inclined amount, respectively, when said lever exists outside said dead area.

5. An image processing system according to claim 1, further comprising:

a guide having a guide portion which is formed around said lever and defines a lever physically inclinable range having a predetermined shape when said lever is brought into contact with an inner periphery of said guide portion;

said image processor being operable to determine on the basis of said inclined amount data whether or not said lever exists within a further dead area which is in the vicinity of a maximum peripheral area of said physically inclinable range and has a predetermined shape; and wherein said image processor is operable to perform a third correction operation which corrects said inclined amount data to predetermined inclined amount data when said image processor determines that said lever exists within said further dead area, wherein said image processor outputs the image data on the basis of inclined amount data which is corrected by said second correction operation when said lever exists outside both said first dead area and said further dead area, or on the basis of inclined amount data which is corrected by said third correction operation when said lever exists outside said first dead area and within said further dead area.

6. An image processing system according to claim 5, wherein said second dead area is formed by an outer line defined by a shape of said inner periphery of said guide portion and an inner line having an arbitrary shape different from said shape of said inner periphery.

7. An image processing system according to claim 5, wherein said shape of said inner periphery of said guide portion is a polygonal shape having corners the number of which is larger than the number of comers of a pentagonal shape, and said shape of said inner line of said second dead area is a circular shape inscribed to said polygonal shape.

8. An image processing system according to claim 5, wherein said shape of said inner periphery of said guide portion is a polygonal shape having corners the number of which is larger than the number of comers of a pentagonal shape, and said shape of said inner line of said second dead area is a further polygonal shape having corners which are brought into contact with predetermined corners of said polygonal shape.

9. An image processing system according to claim 8, wherein said shape of said inner periphery of said guide portion is an octagonal shape, and said further polygonal shape is a rectangular shape having four comers which are brought into contact with every second comers of said octagonal shape.

10. An image processing system which comprises an image processor which generates image data of an image to be displayed on a monitor, and an analog joystick, comprising:

a joystick lever which is inclined within an inclinable range when said lever is operated by an operator and rests at a predetermined state indicative of a center of a coordinate reference frame if said lever is not operated by the operator;

inclined amount data output circuitry which outputs inclined amount data according to an inclined amount of said lever; and an image processor being operable to determine on the basis of said inclined amount data whether or not said lever exists within a dead area including the center of said coordinate reference frame;

said image processor being operable to perform a first correction operation to correct said inclined amount data to center data indicative of said center when it determines that said lever exists within said dead area, and being operable to perform a second correction operation to correct said inclined amount data in accordance with a predetermined equation;

said image processor being operable to output image data on the basis of inclined amount data which is corrected in accordance with said first correction operation when said lever exists within said dead area, or on the basis of inclined amount data which is corrected by said second correction operation when said lever exists outside said dead area.

11. An image processing system according to claim 10, wherein said image processor is operable to output X direction inclined amount data indicative of an inclination of said lever in an X direction, and outputs Y direction inclined amount data indicative of an inclination of said lever in a Y direction.

12. An image processing system according to claim 11, wherein said second correction operation includes subtracting predetermined values from said X direction inclined amount and said Y direction inclined amount, respectively, when said lever exists outside said dead area.

13. An image processing system which comprises an image processor which generates image data of an image to be displayed on a monitor, and an analog joystick, comprising:
    a joystick lever which is inclined within an inclinable range when said lever is operated by an operator and rests at a predetermined state indicative of a center of a coordinate reference frame if said lever is not operated by the operator;
    a guide portion which is formed around said lever and defines a lever physically inclinable range having a predetermined shape when said lever is brought into contact with an inner periphery of said guide portion;
    inclined amount data output circuitry which outputs inclined amount data according to an inclined amount of said lever; and
    an image processor being operable to determine on the basis of said inclined amount data whether or not said lever exists within a first dead area including the center and to determine on the basis of said inclined amount data whether or not said lever exists within a second dead area which is in the vicinity of a maximum peripheral area of said inclinable range and has a predetermined shape;
    said image processor being operable to perform a first correction operation which corrects said inclined amount data outputted by said inclined data output circuitry when said image processor determines that said lever exists outside said first dead area and determines that said lever exists outside said second dead area;
    said image processor being operable to perform a second correction operation to correct said inclined amount data to predetermined inclined amount data when said image processor determines that said lever exists within said second dead area;
    said image processor being operable to output image data on the basis of inclined amount data which is corrected by said first correction operation when said lever exists outside both said first dead area and said second dead area, or on the basis of inclined amount data which is corrected by said second correction operation when said lever exists outside said first dead area and within said second dead area.

14. An image processing system according to claim 13, wherein said second dead area is formed by an outer line defined by a shape of said inner periphery of said guide portion and an inner line having an arbitrary shape different from said shape of said inner periphery.

15. An image processing system according to claim 13, wherein said shape of said inner periphery of said guide portion is a polygonal shape having corners the number of which is larger than the number of corners of a pentagonal shape, and said shape of said inner line of said second dead area is a circular shape inscribed to said polygonal shape.

16. An image processing system according to claim 13, wherein said shape of said inner periphery of said guide portion is a polygonal shape having corners the number of which is larger than the number of corners of a pentagonal shape, and said shape of said inner line of said second dead area is a further polygonal shape having corners which ar brought into contact with predetermined corners of said polygonal shape.

17. An image processing system according to claim 16, wherein said shape of said inner periphery of said guide portion is an octagonal shape, and said further polygonal shape is a rectangular shape having four corners which are brought into contact with every other corner of said octagonal shape.

18. An image processing system which comprises an image processor which generates image data of an image to be displayed on a monitor, and an analog joystick, comprising:
    a joystick lever which is inclined within an inclinable range when said lever is operated by an operator and rests at a predetermined state indicative of a center of a coordinate reference frame if said lever is not operated by the operator;
    a guide having a guide portion which is formed around said lever and defines a physically inclinable range having a predetermined shape when said lever is brought into contact with an inner periphery of said guide portion;
    inclined amount data output circuitry which outputs inclined amount data according to an inclined amount of said lever; and
    an image processor being operable to determine on the basis of said inclined amount data whether or not said lever exists within a first dead area including the center;
    said image processor being operable to perform a first correction operation which corrects said inclined amount data to center data indicative of said center when said image processor determines that said lever exists within said first dead area;
    said image processor being further operable to determine on the basis of said inclined amount data whether or not said lever exists within a second dead area which is in the vicinity of a maximum peripheral area of said physically inclinable range and has a predetermined shape;
    said image processor being operable to perform a second correction operation which corrects said inclined amount data outputted by said inclined data output circuitry when said image processor determines that said lever exists outside said first dead area and determines that said lever exists outside said second dead area;
    said image processor being operable to perform a third correction operation which corrects said inclined amount data to predetermined inclined amount data when said image processor determines that said lever exists within said second dead area;
    said image processor being operable to output image data on the basis of inclined amount data which is corrected by said first correction operation when said lever exists within said first dead area, or on the basis of inclined amount data which is corrected by said second correction operation when said lever exists outside both said first dead area and said second dead area, or on the basis of inclined amount data which is corrected by said third correction operation when said lever exists outside said first dead area and within said second dead area.

19. For use in an image processing system which includes an image processor for generating image data of an image to be displayed on a monitor, and an analog joystick lever which has an inclinable range when said lever is operated by an operator and rests at a predetermined state indicative of a center of a coordinate reference frame if said lever is not operated by the operator, a method of operating said image processing system comprising the steps of:

generating an inclined amount output data according to an inclined amount of said lever;

determining by said image processor on the basis of said inclined amount data whether or not said lever exists within a dead area including the center;

performing a first correction operation by said image processor to correct said inclined amount data to center data indicative of said center when it is determined that said lever exists within said dead area;

performing a second correction operation by said image processor to correct said inclined amount data on the basis of an inclined amount equal to a distance from said center to said dead area when it determines that said lever exists outside said dead area; and outputting image data on the basis of inclined amount data which is corrected by said first correction operation when said lever exists within said dead area, or on the basis of inclined amount data which is corrected by said second correction operation when said lever exists outside said dead area.

20. A method according to claim 19, further including the step of:

determining on the basis of said inclined amount data whether or not said lever exists within a further dead area which is in the vicinity of a maximum area of said physically inclinable range and has a predetermined shape.

21. A method according to claim 20, further including the steps of:

performing a third correction operation which corrects said inclined amount data to predetermined inclined amount data when said image processor determines that said lever exists within said further dead area; and outputting the image data on the basis of inclined amount data which is corrected by said second correction operation when said lever exists outside both said first dead area and said further dead area, or on the basis of inclined amount data which is corrected by said third correction operation when said lever exists outside said first dead area and within said further dead area.

22. For use in an image processing system which includes an image processor for generating image data of an image to be displayed on a monitor, and an analog joystick lever which has an inclinable range when said lever is operated by an operator and rests at a predetermined state indicative of a center of a coordinate reference frame if said lever is not operated by the operator, a method of operating said image processing system comprising the steps of:

generating an inclined amount output data according to an inclined amount of said lever;

determining on the basis of said inclined amount data whether or not said lever exists within a dead area including the center of said coordinate reference frame;

performing a first correction operation to correct said inclined amount data to center data indicative of said center when said lever exists within said dead area;

performing a second correction operation to correct said inclined amount data in accordance with a predetermined equation; and outputting image data on the basis of inclined amount data which is corrected in accordance with said first correction operation when said lever exists within said dead area, or on the basis of inclined amount data which is corrected by said second correction operation when said lever exists outside said dead area.

23. A method according to claim 22, further including the steps of outputting X direction inclined amount data indicative of an inclination of said lever in an X direction, and outputting Y direction inclined amount data indicative of an inclination of said lever in a Y direction.

24. A method according to claim 23, wherein said step of performing said second correction operation includes the step of subtracting predetermined values from said X direction inclined amount and said Y direction inclined amount, respectively, when said lever exists outside said dead area.

* * * * *